United States Patent [19]
Morgan et al.

[11] Patent Number: 5,181,250
[45] Date of Patent: Jan. 19, 1993

[54] NATURAL LANGUAGE GENERATION SYSTEM FOR PRODUCING NATURAL LANGUAGE INSTRUCTIONS

[75] Inventors: Jerry L. Morgan, Urbana; Alan M. Frisch, Champaign, both of Ill.; Erhard W. Hinrichs, Tuebingen, Fed. Rep. of Germany

[73] Assignee: Motorola, Inc., Schaumburg, Ill.

[21] Appl. No.: 800,780

[22] Filed: Nov. 27, 1991

[51] Int. Cl.$^5$ ............ G10L 5/02; G08G 1/123; G06F 15/50; G01C 21/00
[52] U.S. Cl. ............ 381/51; 340/988; 340/990; 340/995; 364/443; 364/444; 364/424.01
[58] Field of Search ............ 381/31, 51; 340/988, 340/990, 995; 364/443, 444, 449, 424.01

[56] References Cited

U.S. PATENT DOCUMENTS

| | | | |
|---|---|---|---|
| 4,384,170 | 5/1983 | Mozer et al. | 381/31 |
| 4,882,696 | 11/1989 | Nimura et al. | 364/444 |
| 5,041,983 | 8/1991 | Nakahara et al. | 340/990 |
| 5,043,902 | 8/1991 | Yokoyama et al. | 364/444 |
| 5,067,081 | 11/1991 | Person | 364/444 |

Primary Examiner—Arthur G. Evans
Assistant Examiner—Kee M. Tung
Attorney, Agent, or Firm—Joseph P. Krause

[57] ABSTRACT

In certain computerized systems, computer-generated spoken instructions are made more natural sounding by using recursion to identify significant points in a series of similar instructions when an utterance should be made. No instructions are issued when such instructions would provide little or no information to a user. In a vehicle navigation system, instructions to a driver are typically issued at points along the drivers route where the driver should perform some critical action.

8 Claims, 1 Drawing Sheet

NATURAL LANGUAGE GENERATION SYSTEM FOR PRODUCING NATURAL LANGUAGE INSTRUCTIONS

FIELD OF THE INVENTION

This invention relates to artificial intelligence. More particularly, this invention relates to computer systems using artificial-intelligence-related data processing techniques for generating natural language-like instructions.

BACKGROUND OF THE INVENTION

Generating speech from a computer is known in the art. A computer can generate speech a number of ways, but the structure of the language from a computer rarely resembles natural human speech. Prior art of computer generated speech typically stores a limited number of sentences which can be uttered at predetermined times, which limits the expressiveness of computer-generated language. In such prior art systems, representations of sentences are output to a speech synthesizer to produce audible sounds.

Human instructions to a driver typically instruct the driver to follow some path until some recognizable event occurs and thereafter to perform some other action. In a vehicle navigation system, prior art speech generation methods, which store a limited number of sentences, would likely be unable to produce maximally useful instructions to the user, since the instructions required in such a system might change in an almost limitless number of combinations. More helpful instructions from a machine would more closely resemble the style, syntax, and structure of instructions from a human.

In speech synthesis, and more particularly, in a vehicle navigation system, a method of generating naturally structured instructions to a user from a computer would be an improvement over the prior art.

SUMMARY OF THE INVENTION

There is provided a computerized natural language instruction system that produces from a computer, natural sounding instructions. In the preferred embodiment, these natural-language-like instructions are used in conjunction with a vehicle navigation system to produce instructions to the vehicle's driver on how to traverse a route between the vehicle's current location and a desired destination location, which locations are input to the system by the user. The system could also be used to navigate other entities along a route however.

The vehicle navigation system included a route finder, which calculated a series of road segments, (also referred to as links) that linked the starting and destination points. A vehicle location device, such as a LORAN system or GPS (Global Positioning System), preferably provides input information to the system to monitor progress of the vehicle along the way.

The system requires a map data base of information on a plurality of characteristics of road segments that it uses. Some of the characteristics of a road segment might include, the direction, the type (an interstate highway as opposed to an expressway entrance ramp for example), the length, the speed limit, is it one-way or two-way, intersecting segments, adjacent landmarks, etc. The data base preferably includes other details, such as the actual direction of a road segment, as well as its nominal direction. (For example, even numbered interstate highways are designated east-west, but the actual direction of one or more segments of the even-numbered interstate highway might actually be north-south.)

An analysis of the route required to travel between the starting location and the destination location yields a set of driver action plans, which are actions that the driver must perform to travel from one road segment (link) to the next. A speech act planner produces a specification of the speech act(s) required to convey information to the driver that will make it possible for the driver to carry out the driving action produced by the driver action planner. The speech act specification may be quite complex, and must be reduced to a sequence of clauses in English (or whatever language is used by the system). For this purpose the speech act specification is input to a clausifier, which translates it to a set of clause-sized sentence specifications. These sentence specifications each embody the content of a sentence that will ultimately be translated into English (or some other language) by the Unicorn sentence generation system. But before the sentence specifications can be processed by Unicorn they must first be translated into the form of directed acyclic graphs ("dags", implemented as prolog lists), which Unicorn requires for its input. This transformation is performed by the dagifier. Each output dag from the dagifier is then sent to the Unicorn sentence generator, which generates a sentence of English (nor some other language) that fits the sentence specification originally produced by the dagifier. The Unicorn sentence generator produces output sentences using a unification-based grammar for some language (English, in the current embodiment) and a lexicon for that language which represents its entries (its words) as complex feature structures.

DESCRIPTION OF A PREFERRED EMBODIMENT

Figure 1:
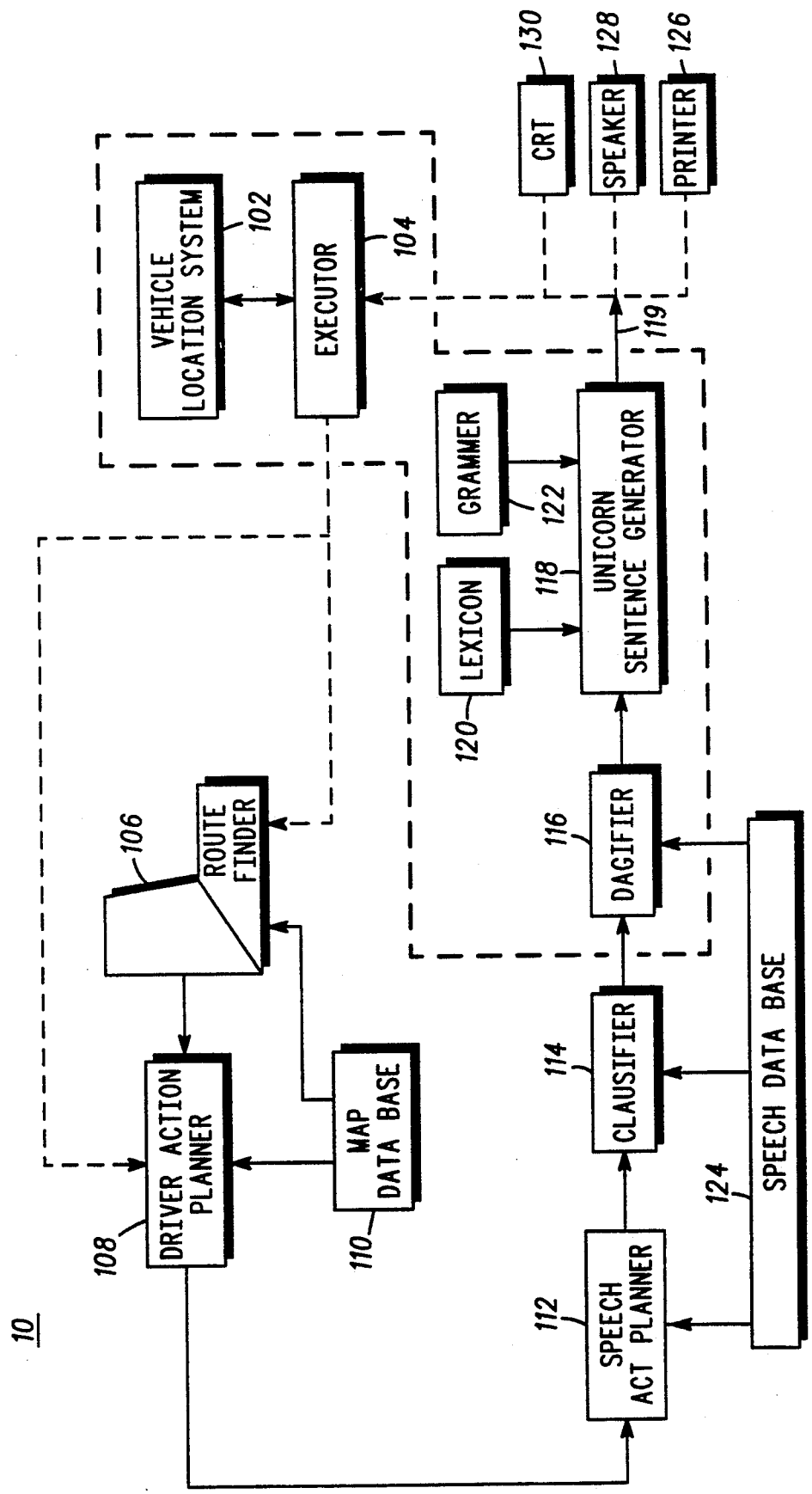
FIG. 1 shows a block diagram of the information flow between the various software modules of the preferred embodiment.

The system shown in FIG. 1 was implemented on Sun Microsystems Inc. Sparc Station workstation, principally written in Quintus PROLOG.

FIG. 1 shows a block diagram of the information flow between the various software modules of the preferred embodiment of a natural language speech synthesizer (10) for producing natural language instructions. (With the exception of the vehicle location system 102, and the output devices 126, 128, and 130, the elements shown in FIG. 1 are implemented as software in a computer. With the exception of the UNICORN Sentence Generator, which is a commercially available sentence generator, Copyright, by Earhardt Hinrichs, the source code for the modules shown in FIG. 1 is given in the appendix below. In the following discussion of FIG. 1, reference will frequently be made to the appended source code. Knowledge of at least the computer programming languages PROLOG and C is required for a complete understanding of the program by the reader.)

With the exception of Unicorn (118), the route finder (106) and the vehicle location system (102), which are not part of the invention, the elements of the system (10) shown in FIG. 1 function as part of a vehicle navigation system. A vehicle location identifier device, (102) such as LORAN, GPS or dead reckoning for example preferably tracks the vehicles current position. A desired destination location can be selected by a number of means and is entered to the route finder through an appropriate input device. The identity of a road (link) that is the desired destination could be entered into the route finder (106) from a computer keyboard. Geographic coordinates could be entered as well. A movable cursor representing the destination could be displayed on a map at the desired destination. Having selected the destination and knowing the current location, the route finder (106) generates at least one list of links between the starting and destination locations.

Map data base

To be useful with a vehicle navigation system, various characteristics of the various links of the route must be known by the system (10). Some of these characteristics might include for example, the name of segment, its length, its actual direction, its nominal direction, if it's one-way, its speed limit, adjacent land marks, etc..) The structure of a map database and an example of a database record for a road segment appears below as such:

```
link(
  LinkId - Integer 1-99,999,999
  Street Name Prefix - E.g. *WEST* Springfield
  Street Name
  Street Type - Usually part of name, e.g. RD, RAMP
  Street Name Suffix - E.g. Dan Ryan *SOUTH*
  Link Class - Integer specifying the nature of the link:
    street, alley, expressway, ramp, etc.
  Landmark Type - When link is itself a landmark
    E.g. bridge
  Average Speed - Integer for mph
  Number of Lanes - Integer
  Oneway info - B for two-way streets
    T for one-way toward reference point
    F for one-way away from reference point
  Length - Real number for length in miles
)
``` where a single record might be:
link(13307,na,'OLDE FARM','RD',na, '4',na,25,2,'B',0.103999).
additional examples of which are listed in the sample map data base file, links.pl.

Operation of the system

The listing main 10.pl contains the programs' main loop, aptly named main_loop, which obtains the destination from the user, obtains a route from the route finder, optionally announces the route for diagnostic purposes, optionally provides a summary of the route, calculates and produces the instructions as the vehicle traverses the route, and finally announces arrival at the destination.

Main_loop is reproduced below for convenience:

```
main_loop:-
setup_route,          %% 1: get the route and store it.
tell_route,           %% Say what the route is for
                      %% debugging purposes
(givepreroute —>      %% 2: if the pre-route summary
give_pre_route        %% switch is on, give a summary
;true),               %% of the route.
start_when_ready,     %% 3: when the user gives the
                      %%    signal, %% start the route.
complex_turn_loop([]),%% 4: loop til the route is
  traversed.
announce_end_of_route,%% 5: tell the user we're there,
main_loop.            %% 6: and loop for the next
```

-continued route.

Specifying the route

Within the main loop, the setup_route procedure prompts the user for a specification of location and destination, then submits these two specifications to the route finder, which returns a list link identifiers constituting a specification of the route to be traversed between the current location and the desired destination. This route is then installed as the recommended route in the instruction system's database, for use in generating instructions and in tracking the progress of the vehicle through the route.

For development and debugging purposes only, the instruction system then announces the route by displaying on the computer monitor the list of links that constitutes the route.

Pre-route summary

As an optional feature, designed to be turned on or off by the user, the instruction system next provides a summary of the route to the driver. A driver who has some idea of the gross structure of the route being traversed will be more comfortable and better prepared psychologically to traverse the route safely. For this reason the system optionally supplies such a summary to the driver, describing the major properties of the route.

The summarizer analyzes the route by grouping links in the route representation into segments. A segment is a sequence of links that is likely to be perceived as a single entity by the driver. Informally, a segment is a sequence of links which is straight and in which each link has the same street name (links with different prefix but the same base name, e.g. North Algonquin and South Algonquin, are considered as one segment).

In constructing the summary, the system traces link by link along the route while building segment information. At every step, it keeps track of what kind of segment the current link is. For each link in the route, it analyzes whether there is any important property change between the current link and the next link (e.g. link name change, link type or link class change). If none, it appends the next link to the current segment, and updates current segment information. Otherwise, it saves the current segment, then creates new segment information for the next link. If the current segment and the new segment are both default-segment type, it concatenates both segments into a larger segment. It iterates this process until the last link in the route is reached. This parsing of the route is then used to generate clause specifications that are input to the Unicorn sentence generator, which uses these specifications to generate a sequence of English sentences, constituting the pre-route summary.

Traversing the route

Once the optional pre-route summary is completed, the system waits for a signal that the driver is ready to begin the route. In the current embodiment this is done by waiting for a key-press from the user, but it might be done in other ways; for example, by waiting for a signal from the navigation system that the vehicle has begun to move.

Computational effort during traversal of the route is performed from within a single function, complex_loop_loop([]). (In PROLOG, such functions are commonly referred to as "procedures".) The complex_turn_loop procedure in turn calls other procedures to calculate driver actions, plan speech acts, and to execute speech act plans by producing driving instructions.

Driver action analysis

Once the route is obtained from the route finder, the actions required of a driver to traverse the route are planned, or calculated, by the driver action planner (108), which is called from within complex_turn_loop. The driver action planner (108) is comprised of at least three procedure calls in the complex_turn_loop(-World) PROLOG procedure. Referring to the source code listing below, alternatively to the copy of complex_turn_loop reproduced here for convenience.

```
complex_turn_loop(World) :-
plan_complex_turn(Cplan),         %% 1: get next driver action
Dplan = has_done(driver,Cplan),   %% 2: Form the driver
                                  %% goal
NewWorld1 = [needs(driver,Dplan)|World],  %% 3: Enter the
                                  %% driver
                                  %% goal into the
                                  %% world set
s_plan(believe(navigator,Dplan),  %% 4: call the speech
NewWorld1,                        %% act planner to
Plan),                            %% build a plan.
execute_plan(Plan,NewWorld1,NewWorld),  %% 5: execute
                                  %% the plan.
(check_if_done;                   %% 6: If we're NOT at
                                  %% the
complex_turn_loop(NewWorld)).     %% end of the route,
                                  %% loop around
                                  %% again,
complex_turn_loop(_).             %% else succeed and
                                  %% return to main_loop.
%%%%%%%%%%%%%%%%%%%%%%%%%%%%%%
```

Three procedures, plan_complex_turn(Cplan), Dplan=has_done(driver,Cplan) and NewWorld1=-[needs(driver, Dplna)| World], comprise the driver action planner (108). The procedures, plan_complex-_turn(Cplan), Dplan=has_done(driver,Cplan) and NewWorld1=[needs(driver, Dplan)| World], and accompanying explanatory comments are listed in the source code in the section headed, "dplan.pl".

The analysis of driver action rests on analysis of single intersections. This analysis is performed by the procedure do_simple_turn1, in section headed dplan.pl. This procedure extracts from the map data base two kinds of descriptions of the action required to traverse the intersection: a geometric description, and a functional description. The geometric description is constructed by using geometric information about the intersection, including the angle between the links entering and exiting the intersection. Taken alone, the geometric description might result in instructions like "bear left." From functional properties of the intersection, such as the types of the entering and exiting links, the analyzer constructs a functional description of the driver action, attempting to take into account how the driver would perceive the action. Taken alone, such descriptions might result in instructions like "take the exit ramp."

In addition to these simple geometric and functional descriptions of single intersections, the driver action planner looks for patterns in sequences of such descriptions, to recognize complex maneuvers that may be significant to the driver. An important design characteristic of the system is that it gives instructions that encompass not just one intersection at a time, but possibly several, in a way that better fits the needs and perceptions of the driver. For example, rather than issuing a sequence of three "go-straight" instructions, one intersection at a time, followed by a "turn" instruction, the system would group these maneuvers into a complex instruction, perhaps something like "Go straight for three blocks, then turn left at the light."

Similarly, when two turns come so close together that there is not time for a second instruction to be issued between them, the system will issue a complex instruction for both before the first turn, like "Turn left at the light and then immediately turn right at the stop sign." This pattern-recognition ability requires an analysis of driver actions that can recognize such complex maneuvers where they are appropriate.

The procedure, plan_complex_turn(-Cplan) performs this kind of analysis, constructing a complex driver action description from a series of simple driver action descriptions, which are determined by repeated procedure calls to do_simple_turn1 from within plan_complex_turn(Cplan). The procedure plan_-complex_turn(Cplan) combines such simple driver actions into complex ones, using a repertoire of templates for complex actions, implemented as complex-_turn_op data structures, contained in the section headed turn_ops10.pl. The plan_complex_turn procedure uses these operators in the fashion of simple grammar rules to parse sequences of simple driver actions, returning the parse as a complex driver plan, (Cplan), which describes a high-level action that the driver must perform to traverse some portion of the route.

Speech act planning

Once the (possibly complex) driver action description is completed, it is submitted as input to the speech act planner, which calculates what speech acts the system needs to perform to get the driver to carry out the recommended action.

As described above, the driver action representation is a complex structure containing both geometric and functional descriptions of all driver actions involved in transit from one link to another (possibly distant) link. Generally the driver needs only a subset of this information in order to properly carry out the action. The speech act planner selects an appropriate subset of this information and encodes it in a speech act plan, which is then submitted to the executor, where the speech act plans are put into action via the production of utterances to the driver.

The input which the speech act planner receives from the driver action planner is a single, possibly complex, driver action. Getting the driver to perform the this action is now the navigator's goal. In order to achieve this goal, it uses backchaining with a set of STRIPS-style operators, similar to those described in Fikes and Nilsson (1971). These operators include premises such as (1) through (3).

(1) The navigator can conclude that the driver will do something if the navigator knows that the driver wants to do it.

(2) The navigator can conclude that the driver wants to do something if the navigator knows that the driver knows that s/he needs to do it.

(3) The navigator can conclude that the driver knows that s/he needs to do something if s/he has been told by the navigator, and the driver is able to identify everything referred to by the navigator in this act of telling.

The operation of the speech act planner can be viewed as a process of reasoning from the principles above. A sub-task of the speech-act planner, once the general content of the speech act has been determined, is the selection of landmarks and methods of referring to them. The use of landmarks is indispensable in producing natural, useful driving instructions. An instruction to turn right is useless unless it is clear to the driver where the turn is to be made. And an instruction to turn right at the town hall is useless unless the driver knows where town hall is or can visually identify it from its description. The default assumption is that the driver begins the journey not knowing where anything is. Therefore, the system must produce descriptions of objects that the driver can use to identify landmark objects. A human navigator sitting in the car can do this easily; the navigator merely assumes that if he can see the object then so can the driver, and thus, given a sufficiently discriminating description, the driver could identify the object. The automated system described here must instead use the map database to identify some objects that can be assumed to be visible to the driver. Traffic control devices, such as signs and traffic lights, are assumed to be in the most visible locations, since they are objects to which the driver must pay constant attention.

Speech act planning is initiated by the call to s_plan(believe(navigator, Dplan), NewWorld1, Plan), from within complex_turn_loop(Cplan). The PROLOG procedure s_plan(+Goal, +World, −Plan), reproduced in its entirety below in the section of the listing headed splan.pl, uses STRIPS methodology to construct a speech act plan. (See Fikes and Nilsson, 1971 for a discussion of STRIPS.) As noted below, s_plan1(+Goal, +World, −Plan) performs most of the work for the speech act planner.

The prolog data base contains a set of structures that can be interpreted as the navigator's beliefs. Among them will be beliefs about what the driver knows already, what actions the driver has already performed, and what the navigator believes the driver needs to do. Having a belief that the driver needs to perform some action causes the navigator to search for a plan to cause the driver to carry out the action the navigator believes the driver needs to carry out.

To construct such a plan, the system invokes the STRIPS-like mechanism embodied in the s_plan procedure. Given a goal, it searches for an operator that constitutes the final step toward that goal. It then checks to see if the operator's preconditions are already satisfied. If so, then planning is finished, and the plan consists of one operator, with its variable instantiated via prolog term unification. But if the preconditions of the operator are not already satisfied, it s_plan invokes itself recursively to construct a plan to bring it about the preconditions come true. In this way it constructs a plan consisting of a sequence of operators, each embodying one step in a procedure that leads from the current state of the world to the desired goal. This plan (sequence of operators) is then sent to the execution mechanism, which executes the steps in the plan one by one.

The procedure s_plan is the main procedure of the speech act planner. It takes as arguments a goal (a prolog clause, roughly interpretable as a proposition) and a representation of the state of the world (a list of prolog clauses, roughly interpretable as a set of propositions). It then finds a plan (list of prolog clauses, roughly interpretable as a sequence of actions to be carried out) whose result will be the achievement of the specified gual.

The Navigator's World Beliefs

During its operation, the speech act planner uses as data a set of prolog clauses that constitute beliefs about what is maximally helpful in choosing what to say to the driver. These are implemented in the present system as instances of the "world_belief" predicate, in the section labelled "splan.pl".

The Information Selector Procedures

Based on the strategies implied in the world_belief clauses, the speech act planner invokes several subsidiary procedures, listed in the section labelled "splan.pl", to select and construct pieces of information that will go into the final sentence output, involving description of the turn, referring expressions for streets, landmark selection, and others.

Executing speech act plans

Referring to complex_turn_loop(World), speech acts from the speech act planner s_plan(believe(navigator,(Dplan),NewWorld1,Plan), are executed from within execute_plan(Plan, NewWorld1, NewWorld), which is reproduced in its entirety below in the listing headed "execute10.pl". In execute_plan, the speech act undergoes two transformations. The first transformation is to clausify the speech act, which includes breaking the speech act down into clause-size chunks, thereby keeping sentences relatively short and maximizing intelligibility. The following portion of execute_plan, includes the call to the clausifier:

```
/* If the action is a speech action, the work of information
selection has already been done; so we just send it off to the
clausifier, which in turn will send it to the dagifier, then
to Unicorn to be turned into English */
do_speech_act(tells(navigator,
driver,
needs(driver,has_done(driver,Info)))) :-
vnl,vwrite('Instructions for the next choice point:'),vnl,
(verbose —> (nl,write('The following semantic structure will
be sent to Unicorn:'),nl)
; true),
clausify(Info).
```

The listing clausify.pl, reproduced in its entirety below, includes the source code of the clausifier, clausify(+Info). Clausify(+Info) contemplates various cases, each of which depends upon the information from the speech act planner and operates on the information differently. The clausifier, clausify(+Info) will break up the output of the speech act planner to maximize its intelligibility. The various cases are explained in the source code.

After being clausified, the chunks are dagified, which is the second transformation, and is a translation of the clauses into directed acyclic graphs (dags), which the UNICORN sentence generator requires as input.

In the preferred embodiment, the output of the speech act planner (112), the clausifier (114), and the dagifier (116) is submitted to a sentence generator program, the UNICORN sentence generator (118) (Copyright 1988, by University of Illinois, Dale Gerdemann and Erhard Hinrichs) which produces a sequence of English sentences that are then directed to an output module. The speech act planner (112), the clausifier (114), and the dagifier (116) are designed to produce information specifically structured to the requirements of UNICORN. Alternate embodiments might of course use other sentence generators.

Output from the sentence generator program was submitted to a speech synthesizer available from Digital Equipment Corporation, A DecTalk speech synthesizer which synthesized audible speech. (The DecTalk synthesizer is not shown herein but is available from Digital Equipment Corporation, Maynard, Mass.) Other speech synthesizers that have text-to-speech algorithms that accept printed representations and synthesize sound might be used as well.

The job of the sentence generator (118) is to take a description of the meaning of what is to be said and to produce a natural language sentence that conveys that meaning. This task is accomplished by the unification-based natural language system Unicorn, described in Gerdemann and Hinrichs (1988). Unicorn separates grammatical information from the processing module, which can be used for both natural language parsing and natural language generation.

In generation mode, Unicorn produces natural language text on the basis of underlying logical forms. Unicorn encodes grammatical and lexical information in a feature-based grammar. Linguistically relevant properties of complex phrases are represented as collections of features instantiated with appropriate values. Feature-based grammatical formalisms achieve a good deal of expressive power by allowing feature structures that are only partially instantiated. These partial information structures make feature-based grammer formalisms particularly well-suited for the task of natural language generation. As the generation system constructs a plan of what to say and how to say it, it can record the results of its decisions in partially instantiated feature structures which thereby become progressively more fully instantiated.

Unicorn uses a chart-generation algorithm, which is described in Gerdemann and Hinrichs, Functor-Driven Natural Language Generation with Categorial-Unification Grammars, (Proceedings of the 13'th International Conference on Computational Linguistics, 1990, pages 145–150.). This allows for the generation of different paraphrases for expressing the same content. This feature of Unicorn is particularly important for giving navigational advice. In different situations, the same type of driving maneuver may have to be described by different utterances. In a situation in which there is little time to give the instruction, the system may generate an utterance such as "Turn right at the light." However, if the driver is still two blocks away from the intersection, the system may respond with "Go straight to the next light and take a right there."

The following text, up to the claims, is the source code with comments for the preferred embodiment for the invention.

```
%-*- Mode:Prolog -*-

%%%%%%%%%%%%%%%%%%%%%%%%%%%%%%%%%%

/* C) Copyright 1991 by Jerry L. Morgan. All Rights reserved. */

%%%%%%%%%%%%%%%%%%%%%%%%%%%%%%%%%%

/* main10.pl

This file contains the two main control loops of the system: main_loop and complex_turn_loop.

I. OVERVIEW.

This is a system for generating English instructions to guide a driver through a pre-chosen route, providing speech output at appropriate times as the system tracks the driver's progress through the route.
```

The system was developed in Quintus Prolog version 2.5 on Sun Sparc Stations, and in ALS Prolog on a Motorola Delta Box.

In addition, C and C++ were used to develop software to interface the system to the simulator and speech synthesizer mentioned below.

The system presupposes three additional mechanisms:

1. a method of tracking the location, heading, and speed of the vehicle, where location is provided on demand in the form of two kinds of information: a link id, identifying the road segment on which the vehicle is located; and distance travelled on that segment, in feet. For development purposes the system was connected and tested with a vehicle simulator provided by the Motorola Corporation.
2. a data base of map information, organized around links in the sense described above, including for each link its type, endpoint coordinates, speed limit, length, traffic control devices, advisory signs, building landmarks, points of interest, adjacent link ids, and other properties specified in the sample data base files accompanying the system.

3. a speech synthesizer. For development purposes, a Dec-talk speech synthesizer was used to produce speech output from the system.

IA. OPERATION. The system asks the driver to specify a route. Once a route is chosen, the system analyzes the structure of the entire route, and from this structure provides to the driver a summary of the route. Then as the driver begins the route, the system looks ahead on the route to analyze structured sequences of actions the driver needs to make to traverse the route. For example, one might describe one such structured sequence in ordinary English as "go straight for two blocks and turn right at the stop sign". The system then 'reasons' about what information the driver needs to know to successfully carry out this sequence of actions, and provides that information to the driver in the form of English driving instructions, output through a speech synthesizer. When the destination is reached, the driver is notified, and asked to specify another route.

More detailed description of the operation of the system is distributed throughout these source code files.

```
*/
%%%%%%%%%%%%%%%%%%%%%%%%%%%%%%%%%%%%
/*
```

II. Main Control Structure: main_loop and complex_turn_loop.

main_loop. Call this to start the system

1. First we establish what the route is and install it where
   the relevant mechanisms can find it.

2. Then we give a summary of the route, if desired

3. Then we tell the driver we're ready to begin

4. Then we invoke complex_turn_loop(+World),
   the procedure that tracks us through
   the chosen route. The argument World is a set of prolog
   forms (empty to begin with) representing the navigator's
   current beliefs about the world. These beliefs are
   updated (clauses added or removed) as the vehicle traverses
   the route. The speech act planner uses them in its inference
   processes to decide what needs to be said when.

5. When we return here from complex_turn_loop, we've finished
   the route, so we tell the driver we've arrived.

6. Then we begin again at step 1 for the next route.

*/

```
main_loop :-
          setup_route,          %% 1: get the route and store it.

tell_route,           %% Say what the route is for
                  %%   debugging purposes (givepreroute ->      %% 2: if the pre-route summary
             give_pre_route     %%   switch is on, give a summary
          ; true),              %%   of the route.

start_when_ready,     %% 3: when the user gives the signal,
                  %%   start the route.
```

```prolog
        complex_turn_loop([]),   %% 4: loop til the route is traversed.

announce_end_of_route,   %% 5: tell the user we're there, main_loop.               %% 6: and loop for the next route.

tell_route :-
        current_route(Route),
        nl,write('The route is:'),nl,
        write(Route).

start_when_ready :-
        nl,write('When you are ready to begin, press a key'),
        speak([when,you,are,ready,to,begin,press,a,key]), get(_),          %% wait for any key press.

(simulator -> start_car ; true). %% If we're using a simulator,
                        %% tell the simulator to begin
                        %% the route.

announce_end_of_route :-
        nl,
        write('You have arrived at your destination'),
        speak([you,have,arrived,at,your,destanation]),
        nl.

/* NOTE: 'destanation' is an intentional misspelling to get
dec-talk to pronounce the word correctly */

%%%%%%%%%%%%%%%%%%%%%%%%%%%%%%%%%%%%%%
/* complex_turn_loop(+World)

The route control structure. Loop through this procedure until the route is traversed
```

The argument to complex_turn_loop (World) is a list( possibly empty) of prolog clauses representing the navigator's current beliefs about the world. These beliefs are updated as the vehicle traverses the route. The speech act planner uses them in its inference processes to decide what needs to be said when.

1. Driver action analysis: Scan ahead on the route, analyzing
   turns as driver actions,
   combining simple actions into complex driver actions where
   appropriate.

The result, referred to here as a "complex maneuver" or
   "complex (driver) action", is a prolog list constituting a
   tree structure, which gets interpreted as a description of
   the next action the driver needs to take. This action may
   be simple (e.g. turn right at the next corner), or it may
   be complex (e.g. continue on this street for three blocks
   then turn right at the stop sign).

2. Build a complex driver goal (Dplan): the driver needs to have
   done the complex action produced by the driver action
   planner.

3. Add the driver goal from 2 to World (the list of prolog clauses
   representingthe state of the world). The effect of this is to
   add to the planner's beliefs the proposition that the
   driver needs to perform the driving action produced in 1.
   This is later used as a premise by the speech act planner.

4. Send the representation (from 1) of the (possibly complex)
   driver action to the speech act planner. Return with a
   plan for what needs to be done.

5. Send this plan to be executed. During execution sentences
   get assembled, then output to the driver as instructions.

6. Check if we're at the end of the route.

If we're not done, go back to step 1 to bite off another chunk of the route and give the driver instructions.

If we're done, succeed and go back to main_loop for another route.

*/ complex_turn_loop(World) :- plan_complex_turn(Cplan),    %% 1: get next driver action

Dplan = has_done(driver,Cplan),    %% 2: Form the driver
        %% goal

NewWorld1 = [needs(driver,Dplan)|World],%% 3: Enter the driver
        %% goal into the
        %% world set s_plan(believe(navigator,Dplan),    %% 4: call the speech
      NewWorld1,    %% act planner to
      Plan),    %% build a plan.

execute_plan(Plan,NewWorld1,NewWorld),  %% 5: execute the plan.

(check_if_done;    %% 6: If we're NOT at the
    complex_turn_loop(NewWorld)).    %% end of the route,
        %% loop around again, complex_turn_loop(_).    %% else succeed and
        %% return to main_loop.

%%%%%%%%%%%%%%%%%%%%%%%%%%%%%%%%%%%

/* check_if_done

This procedure just compares the current location with the desired destination. If they're the same, it succeeds (i.e. returns yes) and we're done; else check_if_done fails (i.e. returns no) and we keep going.

*/ check_if_done :- get_current_link_location(Here),!,
        destination(Here).

%%%%%%%%%%%%%%%%%%%%%%%%%%%%%%%%%%

/* setup_route

This procedure gets a route and records it in appropriate places.

1. First we get a destination from the driver, and figure a
   route to get there from here (get_route_from_driver).

2. Then we store the route as current_route(Route) for the
   planner to use (install_route).

3. Then if we're using the simulator we tell the simulator what
   the route is (send_route_to_simulator).

*/ setup_route :-
        get_route_from_driver(Route),    %% 1: get a route.
        install_route(Route),            %% 2: store it.
        (simulator -> send_route_to_simulator(Route)

; true).          %% 3: tell simulator.

%%%%%%%%%%%%%%%%%%%%%%%%%%%%%%%%%%%
/* get_route_from_driver(-Route)

This procedure asks the driver to specify whether the route is to be taken from a file, or from parameters entered from the keyboard.

> First we ask whether the route is to be entered from the
> keyboard, or (for debugging convenience) to come from a
> file. If the driver enters k, we call
> get_route_from_keyboard to get the route from the keyboard;
> if the driver enters f, we call get_route_from_file to
> get the route from a file. In either case, Route is returned
> instantiated to a list of link id's that constitutes the
> route.

*/

```
get_route_from_driver(Route) :-
        nl,write('Enter k to specify your route from the keyboard,
                or f to get it from a file: '),
        (get(102) -> get_route_from_file(Route) ;
            get_route_from_keyboard(Route)).
```

%%%%%%%%%%%%%%%%%%%%%%%%%%%%%%%%%%%
/* get_route_from_keyboard(-Route)

This is procedure we call if the driver wants to enter the route from the keyboard.

1. First we ask the driver for the current location and
   destination location; in this version both are to be specified as link id's.

2. Then we send these two
links off as arguments to the route finder procedure
route(From,To,Route), and return with Route instantiated
to a route, in the form of a list of link id's. The first
member of the list is the current link id, the tail of the
list is the destination.

*/

```
get_route_from_keyboard(Route) :-
        get_current_link(FromLink),!,    %% 1: get endpoints from user
        get_destination_link(ToLink),!,
        route(FromLink,ToLink,Route).    %% 2: get a route between them.
```

%%%%%%%%%%%%%%%%%%%%%%%%%%%%%%%%%%%
/* get_route_from_file(-Route)

This is the procedure we call if the driver wants the route to be read in from a file.

For debugging purposes it's handy to be able to read in a
route from a file, rather than from driver specification and
the route finder. This is useful not only for convenience,
but for the ability to use a route that's different from
what the route-finder would construct.

To use this facility, the "driver" (i.e. programmar) enters
f instead of k. The system then looks for a file named
plan.list in the start-up directory, bypassing the route
finder. But the route read in is passed through the
parse_route procedure, to make sure that it's a valid
route for the current data base. If not, the route is rejected and the driver is asked for another route.

The contents of the plan.list file must be a prolog list of
link id's, followed by a period, where each link id is in
the current data base, and each pair of adjacent link id's
in the list are adjacent in the data base.

*/

```
get_route_from_file(Route) :-
        see('plan.list'),          %% open the route file.
        read(Route),               %% read in the route.
        seen,!,                    %% close the route file.
        (parse_route(Route) -> true ;   %% check if it's a valid
          (nl,                     %% route; if not,
          write('Invalid route'),  %% try again.
          nl,
          get_route_from_driver(Route))).
```

%%%%%%%%%%%%%%%%%%%%%%%%%%%%%%%%%%%%
/*
install_route(+Route)

This procedure stores the selected route where it can be found by relevant procedures,
and sets up various parameters for use by the planning system.

1. Using the last link in the route as the destination, erase
   any earlier destination and record the new one.

2. Install Route as the current route (for use by the planners).

3. Install Route as the tracking route (for use by the tracker).

*/

```
install_route(Route) :-
        get_end_links(Route,_,ToLink),    %% 1: install new
        retract(destination(_)),          %% destination.
        assert(destination(ToLink)), retract(current_route(_)),        %% 2: install new
        assert(current_route(Route)),     %% current_route retract(tracking_route(_)),       %% 3: install new
        assert(tracking_route(Route)).    %% tracking_route.

get_end_links([FromLink|Rest],FromLink,ToLink) :-
        tail(Rest,ToLink).
```

%%%%%%%%%%%%%%%%%%%%%%%%%%%%%%%%%%%%%

/*

Following are several auxiliary procedures for getting route specifications from the driver get_current_link(-FromLink) instantiates its argument to a link id
entered by the driver

*/

```
get_current_link(FromLink) :-
        nl,
        write('Current link: '),
        speak([please,enter,the,current,link,number]),
        get_link(FromLink).
```

/* get_link(+Link) checks its argument to make sure the link is actually in the data base. If it is it just returns it. If it isn't it informs the driver and asks for another link.

```
*/ get_link(Link) :-
        read(Link),
        (is_link(Link);Link == stop).
get_link(X) :-
        nl,
        write('That point is not in the database.'),
        speak([that,link,number,is,not,in,the,data,base]),
        nl,
        write('Choose another link.'),
        speak([please,choose,a,different,link]),
        get_link(X).

/* get_destination(-ToLink) asks the driver for a destination link
id. Like get_link, it calls get_link to check the validity of
the link id.

*/ get_destination_link(ToLink) :-
        nl,
        write('Destination link: '),
        speak([now,enter,the,number,of,your,destanation,link]),
        get_link(ToLink).

%%%%%%%%%%%%%%%%%%%%%%%%%%%%%%%%%%%%%
/*      END OF FILE main10.pl*      */
%%%%%%%%%%%%%%%%%%%%%%%%%%%%%%%%%%%%%

%-*- Mode:Prolog -*-
```

%%%%%%%%%%%%%%%%%%%%%%%%%%%%%%%%

/* C) Copyright 1991 by Jerry L. Morgan. All Rights reserved. */

%%%%%%%%%%%%%%%%%%%%%%%%%%%%%%%%

/* links.pl

The Navigator's World Beliefs

During its operation, the speech act planner uses as data a set of prolog clauses that constitute beliefs about what is maximally helpful in choosing what to say to the driver. These are implemented in the present system as instances of the "world_belief" predicate, in the section labelled "splan.pl".

The Information Selector Procedures

Based on the strategies implied in the world_belief clauses, the speech act planner invokes several subsidiary procedures, listed in the section labelled "splan.pl", to select and construct pieces of information that will go into the final sentence output, involving description of the turn, referring expressions for streets, landmark selection, and others.

Executing speech act plans

Referring to complex_turn_loop(World), speech acts from the speech act planner s_plan(believe(navigator,(Dplan),NewWorld1,Plan), are executed from within execute_plan(Plan, NewWorld1, NewWorld), which is reproduced in its entirety below in the listing headed "execute10.pl". In execute_plan, the speech act undergoes two transformations. The first transformation is to clausify the speech act, which includes breaking the speech act down into clause-size chunks, thereby keeping sentences relatively short and maximizing intelligibility. The following portion of execute_plan, includes the call to the clausifier:

/* If the action is a speech action, the work of information selection has already been done; so we just send it off to the clausifier, which in turn will send it to the dagifier, then to Unicorn to be turned into English */

```
do_speech_act(tells(navigator,
            driver,
                needs(driver,has_done(driver,Info)))) :-
    vnl,vwrite('Instructions for the next choice point:'),vnl,
    (verbose -> (nl,write('The following semantic structure will be sent to
Unicorn:'),nl)
                ; true),
    clausify(Info).
```

The listing clausify.pl, reproduced in its entirety below, includes the source code of the clausifier, clausify(+Info). Clausify(+Info) contemplates various cases, each of which depends upon the information from the speech act planner and operates on the information differently. The clausifier, clausify(+Info) will break up the output of the speech act planner to maximize its intelligibility. The various cases are explained in the source code.

After being clausified, the chunks are dagified, which is the second transformation, and is a translation of the clauses into directed acyclic graphs (dags), which the UNICORN sentence generator requires as input.

In the preferred embodiment, the output of the speech act planner (112), the clausifier (114), and the dagifier (116) is submitted to a sentence generator program, the UNICORN sentence generator (118) (Copyright 1988, by University of Illinois, Dale Gerdemann and Erhard Hinrichs) which produces a sequence of English sentences that are then directed to an output module. The speech act planner (112), the clausifier (114), and the dagifier (116) are designed to produce information specifically structured to the requirements of UNICORN. Alternate embodiments might of course use other sentence generators.

Output from the sentence generator program was submitted to a speech synthesizer available from Digital Equipment Corporation, a DecTalk speech synthesizer which synthesized audible speech . (The DecTalk synthesizer is not shown herein but is available from Digital Equipment Corporation, Maynard, Mass.) Other speech synthesizers that have text-to-speech algorithms that accept printed representations and synthesize sound might be used as well.

The job of the sentence generator (118) is to take a description of the meaning of what is to be said and to produce a natural language sentence that conveys that meaning. This task is accomplished by the unification-based natural language system Unicorn, described in Gerdemann and Hinrichs (1988). Unicorn separates grammatical information from the processing module, which can be used for both natural language parsing and natural language generation.

In generation mode, Unicorn produces natural language text on the basis of underlying logical forms. Unicorn encodes grammatical and lexical information in a feature-based grammar. Linguistically relevant properties of complex phrases are represented as collections of features instantiated with appropriate values. Feature-based grammatical formalisms achieve a good deal of expressive power by allowing feature structures that are only partially instantiated. These partial information structures make feature-based grammar formalisms particularly well-suited for the task of natural language generation. As the generation system constructs a plan of what to say and how to say it, it can record the results of its decisions in partially instantiated feature structures which thereby become progressively more fully instantiated.

Unicorn uses a chart-generation algorithm, which is described in Gerdemann and Hinrichs, Functor-Driven Natural Language Generation with Categorial-Unification Grammars, (Proceedings of the 13'th International Conference on Computational Linguistics, 1990, pages 145-150.). This allows for the generation of different paraphrases for expressing the same content. This feature of Unicorn is particularly important for giving navigational advice. In different situations, the same type of driving maneuver may have to be described by different utterances. In a situation in which there is little time to give the instruction, the system may generate an utterance such as ``Turn right at the light.'' However, if the driver is still two blocks away from the intersection, the system may respond with ``Go straight to the next light and take a right there.''

The source code for the invention is reproduced below.

```
%-*- Mode:Prolog -*-

%%%%%%%%%%%%%%%%%%%%%%%%%%%%%%%%%
/* C) Copyright 1991 by Jerry L. Morgan. All Rights reserved. */
%%%%%%%%%%%%%%%%%%%%%%%%%%%%%%%%%

/* main10.pl
```

This file contains the two main control loops of the system: main_loop and complex_turn_loop.

I. OVERVIEW.

This is a system for generating English instructions to guide a driver through a pre-chosen route, providing speech output at appropriate times as the system tracks the driver's progress through the route.

The system was developed in Quintus Prolog version 2.5 on Sun Sparc Stations, and in ALS Prolog on a Motorola Delta Box.

In addition, C and C++ were used to develop software to interface the system to the simulator and speech synthesizer mentioned below.

The system presupposes three additional mechanisms:

1. a method of tracking the location, heading, and speed of the vehicle, where location is provided on demand in the form of two kinds of information: a link id, identifying the road segment on which the vehicle is located; and distance travelled on that segment, in feet. For development purposes the system was connected and tested with a vehicle simulator provided by the Motorola Corporation.

2. a data base of map information, organized around links in the sense described above, including for each link its type, endpoint coordinates, speed limit, length, traffic control devices, advisory signs, building landmarks, points of interest, adjacent link ids, and other properties specified in the sample data base files accompanying the system.

3. a speech synthesizer. For development purposes, a Dec-talk speech synthesizer was used to produce speech output from the system.

IA. OPERATION. The system asks the driver to specify a route. Once a route is chosen, the system analyzes the structure of the entire route, and from this structure provides to the driver a summary of the route. Then as the driver begins the route, the system looks ahead on the route to analyze structured sequences of actions the driver needs to make to traverse the route. For example, one might describe one such structured sequence in ordinary English as "go straight for two blocks and turn right at the stop sign". The system then 'reasons' about what information the driver needs to know to successfully carry out this sequence of actions, and provides that information to the driver in the form of English driving instructions, output through a speech synthesizer. When the destination is reached, the driver is notified, and asked to specify another route.

More detailed description of the operation of the system is
distributed throughout these source code files.

*/
%%%%%%%%%%%%%%%%%%%%%%%%%%%%%%%%%%
/*

II. Main Control Structure: main_loop and complex_turn_loop.

main_loop. Call this to start the system

1. First we establish what the route is and install it where
   the relevant mechanisms can find it.

2. Then we give a summary of the route, if desired

3. Then we tell the driver we're ready to begin

4. Then we invoke complex_turn_loop(+World),
   the procedure that tracks us through
   the chosen route. The argument World is a set of prolog
   forms (empty to begin with) representing the navigator's
   current beliefs about the world. These beliefs are
   updated (clauses added or removed) as the vehicle traverses
   the route. The speech act planner uses them in its inference
   processes to decide what needs to be said when.

5. When we return here from complex_turn_loop, we've finished
   the route, so we tell the driver we've arrived.

6. Then we begin again at step 1 for the next route.

*/

```
main_loop :-
        setup_route,        %% 1: get the route and store it.

tell_route,         %% Say what the route is for
                            %%  debugging purposes (givepreroute ->    %% 2: if the pre-route summary
            give_pre_route  %%   switch is on, give a summary
        ; true),            %%   of the route.

start_when_ready,   %% 3: when the user gives the signal,
                            %%   start the route.

complex_turn_loop([]),  %% 4: loop til the route is traversed.

announce_end_of_route,  %% 5: tell the user we're there, main_loop.          %% 6: and loop for the next route.

tell_route :-
        current_route(Route),
        nl,write('The route is:'),nl,
        write(Route).

start_when_ready :-
        nl,write('When you are ready to begin, press a key'),
        speak([when,you,are,ready,to,begin,press,a,key]), get(_),             %% wait for any key press.

(simulator -> start_car ; true). %% If we're using a simulator,
                            %% tell the simulator to begin
                            %% the route.

announce_end_of_route :-
        nl,
```

```
write('You have arrived at your destination'),
speak([you,have,arrived,at,your,destanation]),
nl.
```

/* NOTE: 'destanation' is an intentional misspelling to get
dec-talk to pronounce the word correctly */

%%%%%%%%%%%%%%%%%%%%%%%%%%%%%%%%%%%
/* complex_turn_loop(+World)

The route control structure. Loop through this procedure until the route is traversed The argument to complex_turn_loop (World) is a list( possibly empty) of prolog clauses representing the navigator's current beliefs about the world. These beliefs are updated as the vehicle traverses the route. The speech act planner uses them in its inference processes to decide what needs to be said when.

1. Driver action analysis: Scan ahead on the route, analyzing
   turns as driver actions,
   combining simple actions into complex driver actions where
   appropriate.

The result, referred to here as a "complex maneuver" or
   "complex (driver) action", is a prolog list constituting a
   tree structure, which gets interpreted as a description of
   the next action the driver needs to take. This action may
   be simple (e.g. turn right at the next corner), or it may
   be complex (e.g. continue on this street for three blocks
   then turn right at the stop sign).

2. Build a complex driver goal (Dplan): the driver needs to have
   done the complex action produced by the driver action
   planner.

3. Add the driver goal from 2 to World (the list of prolog clauses
   representing the state of the world). The effect of this is to
   add to the planner's beliefs the proposition that the
   driver needs to perform the driving action produced in 1.
   This is later used as a premise by the speech act planner.

4. Send the representation (from 1) of the (possibly complex)
   driver action to the speech act planner. Return with a
   plan for what needs to be done.

5. Send this plan to be executed. During execution sentences
   get assembled, then output to the driver as instructions.

6. Check if we're at the end of the route.

If we're not done, go back to step 1 to bite off another
   chunk of the route and give the driver instructions.

If we're done, succeed and go back to main_loop for
   another route.

*/

```
complex_turn_loop(World) :- plan_complex_turn(Cplan),   %% 1: get next driver action

Dplan = has_done(driver,Cplan),   %% 2: Form the driver
                %% goal

NewWorld1 = [needs(driver,Dplan)|World],%% 3: Enter the driver
                %% goal into the
                %% world set s_plan(believe(navigator,Dplan),   %% 4: call the speech
               NewWorld1,                  %% act planner to
               Plan),                      %% build a plan.
```

```
        execute_plan(Plan,NewWorld1,NewWorld),  %% 5: execute the plan.

(check_if_done;              %% 6: If we're NOT at the
        complex_turn_loop(NewWorld)).      %%  end of the route,
             %%  loop around again, complex_turn_loop(_).           %%  else succeed and
                    %%  return to main_loop.
```

%%%%%%%%%%%%%%%%%%%%%%%%%%%%%%%%%%
/* check_if_done

This procedure just compares the current location with the desired destination. If they're the same, it succeeds (i.e. returns yes) and we're done; else check_if_done fails (i.e. returns no) and we keep going.

*/

```
check_if_done :- get_current_link_location(Here),!,
        destination(Here).
```

%%%%%%%%%%%%%%%%%%%%%%%%%%%%%%%%%%
/* setup_route

This procedure gets a route and records it in appropriate places.

1. First we get a destination from the driver, and figure a
   route to get there from here (get_route_from_driver).

2. Then we store the route as current_route(Route) for the
   planner to use (install_route).

3. Then if we're using the simulator we tell the simulator what
   the route is (send_route_to_simulator).

*/

```
setup_route :-
        get_route_from_driver(Route),    %% 1: get a route.
        install_route(Route),            %% 2: store it.
        (simulator -> send_route_to_simulator(Route)
        ; true).                         %% 3: tell simulator.
```

%%%%%%%%%%%%%%%%%%%%%%%%%%%%%%%%%%%%%%
/*
get_route_from_driver(-Route)

This procedure asks the driver to specify whether the route is to be taken from a file, or from parameters entered from the keyboard.

First we ask whether the route is to be entered from the
   keyboard, or (for debugging convenience) to come from a
   file. If the driver enters k, we call
   get_route_from_keyboard to get the route from the keyboard;
   if the driver enters f, we call get_route_from_file to
   get the route from a file. In either case, Route is returned
   instantiated to a list of link id's that constitutes the
   route.

*/

```
get_route_from_driver(Route) :-
        nl,write('Enter k to specify your route from the keyboard,
                or f to get it from a file: '),
        (get(102) -> get_route_from_file(Route) ;
            get_route_from_keyboard(Route)).
```

%%%%%%%%%%%%%%%%%%%%%%%%%%%%%%%%%%%%%%
/* get_route_from_keyboard(-Route)

This is procedure we call if the driver wants to enter the route from the keyboard.

1. First we ask the driver for the current location and
   destination location; in this version both
   are to be specified as link id's.

2. Then we send these two
   links off as arguments to the route finder procedure
   route(From,To,Route), and return with Route instantiated
   to a route, in the form of a list of link id's. The first
   member of the list is the current link id, the tail of the
   list is the destination.

*/ get_route_from_keyboard(Route) :-
        get_current_link(FromLink),!,  %% 1: get endpoints from user
        get_destination_link(ToLink),!,
        route(FromLink,ToLink,Route).  %% 2: get a route between them.

%%%%%%%%%%%%%%%%%%%%%%%%%%%%%%%%%%%
/* get_route_from_file(-Route)

This is the procedure we call if the driver wants the route to be read in from a file.

For debugging purposes it's handy to be able to read in a
    route from a file, rather than from driver specification and
    the route finder. This is useful not only for convenience,
    but for the ability to use a route that's different from
    what the route-finder would construct.

To use this facility, the "driver" (i.e. programmar) enters
    f instead of k. The system then looks for a file named
    plan.list in the start-up directory, bypassing the route
    finder. But the route read in is passed through the
    parse_route procedure, to make sure that it's a valid route for the current data base. If not, the route is
rejected and the driver is asked for another route.

The contents of the plan.list file must be a prolog list of
link id's, followed by a period, where each link id is in the current data base, and each pair of adjacent link id's
in the list are adjacent in the data base.

*/

```
get_route_from_file(Route) :-
        see('plan.list'),         %% open the route file.
        read(Route),              %% read in the route.
        seen,!,                   %% close the route file.
        (parse_route(Route) -> true ;   %% check if it's a valid
            (nl,                  %% route; if not,
            write('Invalid route'),    %% try again.
            nl,
            get_route_from_driver(Route))).
```

%%%%%%%%%%%%%%%%%%%%%%%%%%%%%%%%%%%
/*
install_route(+Route)

This procedure stores the selected route where it can be found by relevant procedures,
and sets up various parameters for use by the planning system.

1. Using the last link in the route as the destination, erase
   any earlier destination and record the new one.

2. Install Route as the current route (for use by the planners).

3. Install Route as the tracking route (for use by the tracker).

*/

```
install_route(Route) :-
        get_end_links(Route,_,ToLink),    %% 1: install new
        retract(destination(_)),          %%    destination.
        assert(destination(ToLink)),
        retract(current_route(_)),        %% 2: install new
        assert(current_route(Route)),     %%    current_route retract(tracking_route(_)),       %% 3: install new
        assert(tracking_route(Route)).    %%    tracking_route.

get_end_links([FromLink|Rest],FromLink,ToLink) :-
        tail(Rest,ToLink).

%%%%%%%%%%%%%%%%%%%%%%%%%%%%%%%%%%%%%
/*

Following are several auxiliary procedures for getting route
specifications from the driver get_current_link(-FromLink) instantiates its argument to a link id
entered by the driver

*/ get_current_link(FromLink) :-
        nl,
        write('Current link: '),
        speak([please,enter,the,current,link,number]),
        get_link(FromLink).

/* get_link(+Link) checks its argument to make sure the link is
actually in the data base. If it is it just returns it. If it
isn't it informs the driver and asks for another link.

*/
```

```
get_link(Link) :-
        read(Link),
        (is_link(Link);Link == stop).
get_link(X) :-
        nl,
        write('That point is not in the database.'),
        speak([that,link,number,is,not,in,the,data,base]),
        nl,
        write('Choose another link.'),
        speak([please,choose,a,different,link]),
        get_link(X).
```

/* get_destination(-ToLink) asks the driver for a destination link id. Like get_link, it calls get_link to check the validity of the link id.

*/

```
get_destination_link(ToLink) :-
        nl,
        write('Destination link: '),
        speak([now,enter,the,number,of,your,destanation,link]),
        get_link(ToLink).
```

%%%%%%%%%%%%%%%%%%%%%%%%%%%%%%%%%%
/*       END OF FILE main10.p*    */
%%%%%%%%%%%%%%%%%%%%%%%%%%%%%%%%%%

%-*- Mode:Prolog -*-

%%%%%%%%%%%%%%%%%%%%%%%%%%%%%%%%%%
/* C) Copyright 1991 by Jerry L. Morgan. All Rights reserved. */
%%%%%%%%%%%%%%%%%%%%%%%%%%%%%%%%%%

```
/* links.pl

This data base file contains data about links of the following kind:

link(
    LinkId - Integer 1-99,999,999
    Street Name Prefix - E.g. *WEST* Springfield
    Street Name
    Street Type - Usually part of name, e.g. RD, RAMP
    Street Name Suffix - E.g. Dan Ryan *SOUTH*
    Link Class - Secret Code
    Landmark Type - When link is itself a landmark
            E.g. bridge
    Average Speed - Integer for mph
    Number of Lanes - Integer
    Oneway info - B for two-way streets
            T for one-way toward reference point
            F for one-way away from reference point
    Length - Real number for length in miles
    )

*/ link(13307,na,'OLDE FARM','RD',na,'4',na,25,2,'B',0.103999).
link(13309,na,'BARK WOOD','RD',na,'4',na,25,2,'B',0.0562958).
link(13310,na,'PINE VALLEY','DR',na,'4',na,25,2,'B',0.0349736).
link(13312,na,'PINE VALLEY','DR',na,'4',na,25,2,'B',0.0487398).
link(13314,na,'PINE VALLEY','DR',na,'4',na,25,2,'B',0.0428194).

%-*- Mode:Prolog -*-

%%%%%%%%%%%%%%%%%%%%%%%%%%%%%%%%%%%%%
/* C) Copyright 1991 by Jerry L. Morgan. All Rights reserved. */
```

%%%%%%%%%%%%%%%%%%%%%%%%%%%%%%%%%%%
/*

This file contains data as to which links connect to which, at what intersection.

The form of each data record is:

link_pair(Link_id1,Link_id2,Intersection_id).

A record of this form is in the database just in case:

1. Linkid1 is in the database.
2. Linkid2 is in the database.
3. The street segments associated with Linkid1 and Linkid2
   meet, at the intersection associated with Intersection_id

*/ link_pair(13307,13306,1).
link_pair(13307,13353,1).
link_pair(13307,13309,3).
link_pair(13309,13310,4).
link_pair(13309,13354,4).
link_pair(13309,13307,3).

%-*- Mode:Prolog -*-

%%%%%%%%%%%%%%%%%%%%%%%%%%%%%%%%%%%
/* C) Copyright 1991 by Jerry L. Morgan. All Rights reserved. */
%%%%%%%%%%%%%%%%%%%%%%%%%%%%%%%%%%%
/* nodes.pl

This data base file contains data about intersections: their coordinates, the links that enter them, the headings of the links, and the type of the intersection.

*/ node(1,-8804796,4207354,0,t,[13307-98,13306-184,-13353-0]).
node(2,-8804794,4207384,0,1,[-13306-4]).
node(3,-8804976,4207417,0,two_way_obtuse,[-13309-69,-13307-293]).
node(4,-8805035,4207351,0,wide_y,[13310-92,13309-215,-13354-341]).
node(5,-8805103,4207352,0,t,[-13345-0,-13312-84,-13310-272]).
node(6,-8805197,4207343,0,two_way_obtuse,[-13314-87,13312-266]).
node(7,-8805280,4207338,0,t,[-13371-1,-13318-86,13314-267]).

%-*- Mode:Prolog -*-

%%%%%%%%%%%%%%%%%%%%%%%%%%%%%%%%%%%%
/* C) Copyright 1991 by Jerry L. Morgan. All Rights reserved. */
%%%%%%%%%%%%%%%%%%%%%%%%%%%%%%%%%%%%
/* operators10.pl

This file contains a set of "operators" used by the speech act planner. These operators function, in effect, as rules of inference in the STRIPS-like speech act planning procedures_plan. For more discussion, see the beginning of splan.pl

I. OVERVIEW OF THE SEMANTICS OF OPERATORS:

Conceptually, we are dealing with sequences of world-states, each characterizable as a set of propositions. An operator can be thought of as a function from world-states to world-states. The 'action' part of an operator is, in effect, just a name for the operator. Since actions map worlds to worlds, actions are not the kind of thing that can be true or false in a world state.

So if we want to distinguish a world-state that is the result of a certain action, we have to distinguish it by some proposition (i.e. state) that is true in the world as a result of the action that leads to that world from some previous world.

So for example if we want to distinguish (via some proposition) worlds that are the result of A do B (an action), we need a corresponding non-action result predicate, like 'has-done', yielding a proposition that can be true in a world.

II. OPERATOR SYNTAX:

operator(<DESIRED EFFECT>,       a single prolog term
    <PRECONDITIONS LIST>, a (possibly empty) list of terms
    <ADDS LIST>,         a (possibly empty) list of terms
    <DELETES LIST>, a (possibly empty) list of terms
    <ACTION>).         a single prolog term

III. OPERATOR SEMANTICS:

DESIRED EFFECT: the goal we are looking for a way to accomplish: some state that results from an action PRECONDITIONS LIST: each term in the list is a proposition (i.e. a state) that must be true before the ACTION can be carried out ADDS LIST: each term is a proposition that becomes true when the ACTION is carried out. These are side effects, in addition to the DESIRED EFFECT DELETES LIST: each term is a proposition (i.e. a state) that becomes false when the ACTION is carried out ACTION: a term that specifies the action that, if carried out, will result in the DESIRED EFFECT becoming true

*/
%%%%%%%%%%%%%%%%%%%%%%%%%%%%%%%%
/*

IV. SOME EXAMPLE OPERATORS. These operators were used in the development and testing of the system. Their functions should be self-evident from the mnemonics of the predicate and variable names used.

IMPORTANT NOTE: For these operators to work with the planner, the initial world must contain at least the following fact:

at(driver,<from>) where <from> is the link the car is on

*/
%%%%%%%%%%%%%%%%%%%%%%%%%%%%%%%%
/*

%%%%%%%%%%%%%%%%%%%%%%%%%%%%%%%%
/* do(X,Action):

This operator maps any world in which the navigator believes that X wants to do Action onto one where the navigator believes X has done the Action, and no longer wants to do it. One way to make it true that X has done some action is to bring it about that X wants to do the action, in which case X will inevitably do the action, and consequently stop wanting to do it.

*/ operator(believe(navigator,has_done(X,Action)),

```
        [believe(navigator,want(X,has_done(X,Action)))],
        [],
        [believe(navigator,want(X,has_done(X,Action))),
          needs(X,has_done(X,Action))],
        do(X,Action)).
```

%%%%%%%%%%%%%%%%%%%%%%%%%%%%%%%%%
/* come_to_want(X,State):

Maps any world where the navigator believes that X knows s/he needs for State to be true, onto one where the navigator additionally believes that X wants State to be true.

One way to get X to want P to be true is to bring it about that X knows s/he needs X to be true.

*/

```
operator(believe(navigator,want(X,State)),
        [believe(navigator,knows(X,needs(X,State)))],
        [],
        [],
        come_to_want(X,State)).
```

%%%%%%%%%%%%%%%%%%%%%%%%%%%%%%%%%
/* come_to_know(Knower,State):

Maps a world where State is true, and navigator has told Knower that State is true, onto one where additionally Knower knows that State is true.

One way X can get to know that P is if P is true and somebody tells X P is true

We want the selection of information to all take place within this operator, as preconditions.

What has to be true in order for the navigator to believe that the driver knows that he needs to perform a certain action.

*/ operator(believe(navigator,
        knows(driver,
                needs(driver,
                        has_done(driver,
                                Turn_description)))),
    [
    %% The navigator has to belief that there is a set of semantic
        %% info called Content, that is maximally helpful to the driver
        %% in making the given turn.

believe(navigator,
            max_helpful(driver,
                Turn_description,
                    Content)), %% The navigator has to have told the driver all and only the
        %% information determined to be in Content.

has_told(navigator,
            driver,
            needs(driver,
                has_done(driver,Content)))
    ],
    [],
        [],
        come_to_know(driver,
            needs(driver,

```
            has_done(driver,
                Turn_description)))).
```

%%%%%%%%%%%%%%%%%%%%%%%%%%%%%%%%%
/* tells(navigator,Knower,State):

Maps any world onto one where navigator has told Knower that state is true.

One way to make it true that X has told Y that P is for X to tell Y that P. In fact the only way.

*/ operator(has_told(navigator,Knower,State),
    [],
    [],    %% could add: Knower knows navigator knows...
    [],
    tells(navigator,Knower,State)).

%%%%%%%%%%%%%%%%%%%%%%%%%%%%%%%%%
/*      END OF FILE operators10.pl      */
%%%%%%%%%%%%%%%%%%%%%%%%%%%%%%%%%

%-*- Mode:Prolog -*-

%%%%%%%%%%%%%%%%%%%%%%%%%%%%%%%%%
/* C) Copyright 1991 by Jerry L. Morgan. All Rights reserved. */
%%%%%%%%%%%%%%%%%%%%%%%%%%%%%%%%%
/* preroute.pl

This file contains the main pre-route summary procedure. This procedure calls procedures in routeinfo.pl to construct the preroute summary.

%%%%%%%%%%%%%%%%%%%%%%%%%%%%%%%%%%

/* give_pre_route

This is the main procedure to call to give a pre-route summar once a route has been chosen. give_pre_route performs the following operations:

1. Inform the driver that a summary is about to begin,
    by sending canned output direct to the synthesizer.

2. Invoke route_info(Route,RouteInfo) to extract the
    information necessary to describe the route in summary.

3. Send this information to the preroute speech act planner,
    which plans a sequence of speech acts (represented as
    dags) and sends them off to unicorn, which constructs
    sentences; these are then sent to the synthesizer as
    output to the driver.

*/

```
give_pre_route :-
        announce_summary,
        current_route(Route),
        route_info(Route,RouteInfo),
    preroute_speech_act(RouteInfo,first).

announce_summary :-
    nl,write('PRE-ROUTE SUMMARY:'),nl,nl,
        speak([here,is,a,summary,of,the,route]).
```

```
%%%%%%%%%%%%%%%%%%%%%%%%%%%%%%%%%%%
%%
%% The pre-route speech act planner
%%
%%%%%%%%%%%%%%%%%%%%%%%%%%%%%%%%%%%

%%   Info = [Fmaneuver,Gmaneuver,Rel_dir,Sharpness,From_ref,To_ref,
%%           SalientLandmarks,RelevantTCDs,Extent,
%%           TempMod,Sub_info].

preroute_speech_act([],_).

%% Ignore ramps for the sake of the preroute summary.

preroute_speech_act([Segment1,

[_,Name2,_,_,_]|

RestOfRoute],

Flag) :- is_ramp_name(Name2), preroute_speech_act([Segment1|RestOfRoute],Flag).

%% "Take <Name1> <Direction> to <Name2>"

preroute_speech_act([[SegmentType1,Name1,Azimuth1,_Length1,_TurnList1],

[SegmentType2,Name2,Azimuth2,_Length2,TurnList2]|

RestOfRoute],

Flag) :- member(SegmentType1,[minor_segment,major_segment,highway_segment]), member(SegmentType2,[minor_segment,major_segment,highway_segment]), get_from_ref(Name1,From_ref), get_to_ref([],Name2,To_ref), az_to_compass(Azimuth1,Compass1), clausify([preroute,take_path,Compass1,[],From_ref,To_ref,[],[],

[],Flag,[]]),
```

```
        incr_flag(Flag,NewFlag),
        preroute_speech_act([[SegmentType2,Name2,Azimuth2,[],TurnList2]|
            RestOfRoute],NewFlag).
```

%% "{First, From there}, you ll take side streets to <major street>.

```
preroute_speech_act([[default_segment,_,_,_,_],
            [SegmentType2,Name2,Azimuth2,_Length2,TurnList2]|
                RestOfRoute],
            first) :-
        get_to_ref([],Name2,To_ref),
        clausify([preroute,take_path,[],[],[side,streets],
            To_ref,[],[],[],first,[]]),
        preroute_speech_act([[SegmentType2,Name2,Azimuth2,[],TurnList2]|
            RestOfRoute],then).

preroute_speech_act([[default_segment,_,_,_,_],
            [SegmentType2,Name2,Azimuth2,_Length2,TurnList2]|
                RestOfRoute],
            Flag) :-
        get_to_ref([],Name2,To_ref),
        clausify([preroute,take_path,[],[],[side,streets],
            To_ref,[],[],[],[from,there],[]]),
        preroute_speech_act([[SegmentType2,Name2,Azimuth2,[],TurnList2]|
            RestOfRoute],Flag).
```

%% If you're on a highway, you have to tell the driver where to exit,
%% even if it's onto a default segment.

```
preroute_speech_act([[SegmentType1,Name1,Azimuth1,_Length1,_TurnList1],
            [SegmentType2,Name2,Azimuth2,_Length2,TurnList2]|
                RestOfRoute],
            Flag) :-
        member(SegmentType1,[highway_segment]),
        get_from_ref(Name1,From_ref),
```

```
        get_to_ref([],Name2,To_ref),
        az_to_compass(Azimuth1,Compass1),
        clausify([preroute,take_ramp,Compass1,[],From_ref,To_ref,[],[],
            [],Flag,[]]),
        incr_flag(Flag,NewFlag),
        preroute_speech_act([[SegmentType2,Name2,Azimuth2,[],TurnList2]|
            RestOfRoute],NewFlag).

% you ll take algonquin road west.

preroute_speech_act([[SegmentType1,Name1,Azimuth1,_Length1,_TurnList1],
        Segment2|
            RestOfRoute],
        Flag) :-
        member(SegmentType1,[minor_segment,major_segment,highway_segment]),
        get_to_ref([],Name1,To_ref),
        az_to_compass(Azimuth1,Compass1),
        clausify([preroute,take_path,Compass1,[],To_ref,[],[],[],
            [],Flag,[]]),
        incr_flag(Flag,NewFlag),
        preroute_speech_act([Segment2|RestOfRoute],NewFlag).

preroute_speech_act([_Segment1,Segment2|RestOfRoute],Flag) :-
        preroute_speech_act([Segment2|RestOfRoute],Flag).

preroute_speech_act([_|_],_).

% Finds ramp names in all caps, beginning with a blank space.
is_ramp_name(LinkName) :-
        name(LinkName,AsciiName),
        reverse(AsciiName,RevName),
        RevName = [80,77,65,82,32|_].

% Finds names in all caps ending with 'EXPY', with no blank.
```

```
is_expressway_name(LinkName) :-
        name(LinkName,AsciiName),
        reverse(AsciiName,RevName),
        RevName = [89,80,88,69|_].

az_to_compass(Azimuth,east) :-
        Azimuth >= 45,
        Azimuth < 135.

az_to_compass(Azimuth,south) :-
        Azimuth >= 135,
        Azimuth < 225.

az_to_compass(Azimuth,west) :-
        Azimuth >= 225,
        Azimuth < 315.

az_to_compass(_,north).

incr_flag(first,then).
incr_flag(then,next).
incr_flag(next,then).

%%%%%%%%%%%%%%%%%%%%%%%%%%%%%%%%%%%%
/*          END OF FILE preroute.pl       */
%%%%%%%%%%%%%%%%%%%%%%%%%%%%%%%%%%%%

%-*- Mode:Prolog -*-

%%%%%%%%%%%%%%%%%%%%%%%%%%%%%%%%%%%%
/* C) Copyright 1991 by Jerry L. Morgan. All Rights reserved. */
%%%%%%%%%%%%%%%%%%%%%%%%%%%%%%%%%%%%
/* routeinfo.pl
```

This file contains procedure that analyze the gross structure of the route, in order to provide a pre-route summary of the route.

*/

%% route_info(+Route, -RouteInfo)
%% given a route (list of linkid) return a pre-route summary

```
route_info([LinkId1, LinkId2 | RestRoute], RouteInfo):-
        init_link_info(LinkId1, LinkId2, Link1Term, LinkEpId, Segment),
        route_info_aux(LinkEpId, Link1Term, Segment,
               [LinkId2 | RestRoute], [], RouteInfo).

route_info_aux(_, _, Segment, [], RevSegments, RouteInfo):-
        reverse([Segment | RevSegments], RouteInfo).

route_info_aux(LinkEpId, LinkTerm, Segment, [NextLink | RestRoute],
               RevSegments, RouteInfo):-
        LinkEpId1 is -LinkEpId,
        get_next_link_info(LinkEpId1, NextLink, NextLinkEpId, NextLinkTerm,
            NodeInfo),
        analyze_turn(LinkEpId1, LinkTerm, NextLinkEpId, NextLinkTerm,
            NodeInfo, Turn),
        analyze_segment(Turn, NextLinkEpId, NextLinkTerm, Segment, RestRoute,
            RevSegments, RouteInfo).

analyze_segment(Turn, NextLinkEpId, NextLinkTerm,
               [default_segment | RestSegmentInfo1],
                   RestRoute, RevSegments, RouteInfo):-
        segment_change(Turn),
        next_segment(Turn, NextLinkEpId, NextLinkTerm,
               [SegmentType | RestSegmentInfo2]),
        ( SegmentType == default_segment ->
            append_segment(Turn, NextLinkTerm,
```

```
              [default_segment | RestSegmentInfo1],
              NewSegment),
       route_info_aux(NextLinkEpId, NextLinkTerm, NewSegment,
              RestRoute, RevSegments, RouteInfo)
;
       route_info_aux(NextLinkEpId, NextLinkTerm,
              [SegmentType | RestSegmentInfo2],
              RestRoute,
              [[default_segment|RestSegmentInfo1]|RevSegments],
              RouteInfo)
).

analyze_segment(Turn, NextLinkEpId, NextLinkTerm, Segment, RestRoute,
       RevSegments, RouteInfo):-
   segment_change(Turn),
   next_segment(Turn, NextLinkEpId, NextLinkTerm, NextSegment),
   route_info_aux(NextLinkEpId, NextLinkTerm, NextSegment, RestRoute,
       [Segment | RevSegments], RouteInfo).

analyze_segment(Turn, NextLinkEpId, NextLinkTerm, Segment, RestRoute,
       RevSegments, RouteInfo):-
   append_segment(Turn, NextLinkTerm, Segment, NewSegment),
   route_info_aux(NextLinkEpId, NextLinkTerm, NewSegment, RestRoute,
       RevSegments, RouteInfo).

segment_change([_, _, _, LinkChange, _]):-
       member(LinkChange, [exit_highway, enter_highway, exit_ramp, enter_ramp,
              namechange(_)]).

%% init_link_info(+LinkId1, +LinkId2, -Link1Term, -EpId1, -SegmentInfo1)
%% given a linkId and the next link id return the 'state' of current
%% route (state = <LinkTerm, Endpoint, Segment>)
%% where LinkTerm = Link data where it travels at
%%       Endpoint = Endpoint where it travels from
```

%%    Segment = list of current segment info

```
init_link_info(LinkId1, LinkId2, LinkTerm, LinkEpId, Segment):-
        ep(LinkId1, X, Y, Z, _),
        node(_, X, Y, Z, _, EpOrList),
        link(LinkId1, Prefix1, Basename1, StreetType1, Suffix1,
            LinkClass1, LandmarkType1, AvgSpeed1, NumOfLanes1,
                Oneway1, Length1),
        LinkTerm = link(LinkId1, Prefix1, Basename1, StreetType1, Suffix1,
            LinkClass1, LandmarkType1, AvgSpeed1, NumOfLanes1,
                Oneway1, Length1),
        ( in_ep_or_list(LinkId2, _, EpOrList) ->
            LinkEpId is -LinkId1,
            ep(LinkEpId, X1, Y1, Z1, _),
            node(_, X1, Y1, Z1, _, EpOrList1),
            create_segment(LinkEpId, EpOrList1, LinkTerm, [], Segment)
        ;
            LinkEpId = LinkId1,
            create_segment(LinkEpId, EpOrList, LinkTerm, [], Segment)
        ).

%get_next_link_info(+LinkEpId1, +NextLink, -NextLinkEpId, -NextLinkTerm,
%       -NodeInfo):-
get_next_link_info(LinkEpId1, NextLink, NextLinkEpId, NextLinkTerm,
        NodeInfo):-
%       write(NextLink), nl,
        ep(LinkEpId1, X, Y, Z, _),
        node(NodeId, X, Y, Z, NodeType, EpOrList),
        NodeInfo = node(NodeId, X, Y, Z, NodeType, EpOrList),
        link(NextLink, Prefix1, Basename1, StreetType1, Suffix1,
            LinkClass1, LandmarkType1, AvgSpeed1, NumOfLanes1,
                Oneway1, Length1),
        NextLinkTerm =
            link(NextLink, Prefix1, Basename1, StreetType1, Suffix1,
                LinkClass1, LandmarkType1, AvgSpeed1, NumOfLanes1,
```

Oneway1, Length1),
    in_ep_or_list(NextLink, NextLinkEpId, EpOrList).

%% create_segment(+FromEpId, +EpOrList, +LinkTerm, -SegmentInfo).
%%   create segment information for traveling from FromEpId
create_segment(FromEpId, EpOrList, LinkTerm, [],
        [SegmentType, SegmentName, SegmentDirection,
            SegmentLength, []]):-
        segment_type(LinkTerm, SegmentType),
%       arg(3, LinkTerm, SegmentName),
%       arg(3, LinkTerm, SegmentName),
        arg(3, LinkTerm, BaseName),
        arg(4, LinkTerm, StreetType),
        arg(5, LinkTerm, StreetSuffix),
        concat_street_name('na',BaseName,StreetType,StreetSuffix,SegmentName),
        segment_direction(FromEpId, EpOrList, LinkTerm,
                SegmentType, SegmentDirection),
        arg(11, LinkTerm, SegmentLength).

create_segment(FromEpId, EpOrList, LinkTerm, Turn,
        [SegmentType, SegmentName, SegmentDirection,
            SegmentLength, [Turn]]):-
        segment_type(LinkTerm, SegmentType),
%       arg(3, LinkTerm, SegmentName),
        arg(3, LinkTerm, BaseName),
        arg(4, LinkTerm, StreetType),
        arg(5, LinkTerm, StreetSuffix),
        concat_street_name('na',BaseName,StreetType,StreetSuffix,SegmentName),
        segment_direction(FromEpId, EpOrList, LinkTerm,
                SegmentType, SegmentDirection),
        arg(11, LinkTerm, SegmentLength).

%segment_type(LinkTerm, SegmentType)
segment_type(LinkTerm, highway_segment):-
        arg(6, LinkTerm, '1').

```
segment_type(LinkTerm, highway_segment):-
        arg(6, LinkTerm, '2'),
        arg(4, LinkTerm, 'HWY') | arg(4, LinkTerm, 'EXPY').
segment_type(LinkTerm, highway_segment):-
        arg(6, LinkTerm, LinkClass),
        LinkClass @=< '4',
        arg(4, LinkTerm, 'HWY') | arg(4, LinkTerm, 'EXPY').

segment_type(LinkTerm, major_segment):-
        arg(6, LinkTerm, '3').

segment_type(LinkTerm, minor_segment):-
        arg(6, LinkTerm, '4').

segment_type(LinkTerm, minor_segment):-
        arg(6, LinkTerm, '5').

segment_type(_, default_segment).

segment_direction(_, _, LinkTerm, highway_segment, Direction):-
        arg(5, LinkTerm, Suffix),   % highway suffix as direction
        Suffix \== na,
        char_to_azimuth(Suffix, Direction).

segment_direction(FromEpId, EpOrList, _, _, Direction):-
        member(FromEpId-InvDirection, EpOrList),
        Direction is (InvDirection+180) mod 360.

%next_segment(Turn, NextLinkEpId, NextLinkTerm, NextSegment)
next_segment([A, B, C, D, [E, F, NodeInfo]],
        NextLinkEpId, NextLinkTerm, NextSegment):-
        arg(6, NodeInfo, EpOrList),
        create_segment(NextLinkEpId, EpOrList, NextLinkTerm,
                [A, B, C, D, [E, F, NodeInfo]],
                NextSegment).
```

```
append_segment(Turn, LinkTerm, [SegmentType, SegmentName, SegmentDirection,
       SegmentLength, SegmentTurns],
     [SegmentType, SegmentName, SegmentDirection, NewSegmentLength,
       NewSegmentTurns]):- arg(11, LinkTerm, LinkLength),
    NewSegmentLength is SegmentLength+LinkLength,
    append(SegmentTurns, [Turn], NewSegmentTurns).

char_to_azimuth('N', 0).
char_to_azimuth('E', 90).
char_to_azimuth('S', 180).
char_to_azimuth('W', 270).

%%****************************************************************
%% Turn analyzer ver 1.0
%%****************************************************************

%%---------------------------------------------------
%% analyze_turn(+FromLink, +ToLink, -Classification)
%%    analyze turn from FromLink to ToLink,
%%    Classification is a list of [Landmark, StreetLandmark,
%%           TrafficSignInfo, LinkChangesInfo, InstersectionType]

analyze_turn(FromEpId, FromTerm, ToEpId, ToTerm, NodeInfo,
       [LandmarkInfo, StreetLandmark, TrafficSignInfo,
        LinkChangesInfo, IntersectionType]):-
    landmark_info(FromEpId, ToEpId, LandmarkInfo),
    street_landmark(FromTerm, ToTerm, StreetLandmark),
    traffic_sign(FromEpId, ToEpId, TrafficSignInfo),
    link_changes_info(FromTerm, ToTerm, LinkChangesInfo),
    intersection_type(FromEpId, ToEpId, NodeInfo, IntersectionType).

analyze_turn(FromLink, ToLink,
```

```
    [LandmarkInfo, StreetLandmark, TrafficSignInfo,
    LinkChangesInfo, IntersectionType]):-
        get_node_info(FromLink, ToLink, FromEpId, ToEpId, NodeInfo),
        link(FromLink, Prefix1, Basename1, StreetType1, Suffix1,
            LinkClass1, LandmarkType1, AvgSpeed1, NumOfLanes1,
            Oneway1, Length1),
        FromTerm = link(FromLink, Prefix1, Basename1, StreetType1, Suffix1,
            LinkClass1, LandmarkType1, AvgSpeed1, NumOfLanes1,
            Oneway1, Length1),
        link(ToLink, Prefix2, Basename2, StreetType2, Suffix2,
            LinkClass2, LandmarkType2, AvgSpeed2, NumOfLanes2,
            Oneway2, Length2),
        ToTerm   = link(ToLink, Prefix2, Basename2, StreetType2, Suffix2,
            LinkClass2, LandmarkType2, AvgSpeed2, NumOfLanes2,
            Oneway2, Length2),
        landmark_info(FromLink, ToLink, LandmarkInfo),
        street_landmark(FromTerm, ToTerm, StreetLandmark),
        traffic_sign(FromEpId, ToEpId, TrafficSignInfo),
        link_changes_info(FromTerm, ToTerm, LinkChangesInfo),
        intersection_type(FromEpId, ToEpId, NodeInfo, IntersectionType).

get_node_info(FromLink, ToLink, FromLink, ToEpId,
        node(NodeId, X, Y, Z, NodeType, EpOrList)):-
    ep(FromLink, X, Y, Z, _),
    node(NodeId, X, Y, Z, NodeType, EpOrList),
    in_ep_or_list(ToLink, ToEpId, EpOrList).

get_node_info(FromLink, ToLink, FromEpId, ToEpId,
        node(NodeId, X, Y, Z, NodeType, EpOrList)):-
    FromEpId is -FromLink,
    ep(FromEpId, X, Y, Z, _),
    node(NodeId, X, Y, Z, NodeType, EpOrList),
    in_ep_or_list(ToLink, ToEpId, EpOrList).

get_node_info(FromLink, ToLink, _, _, _):-
``` error(notconnected, [FromLink, ToLink]).

in_ep_or_list(ToLink, ToLink, EpOrList):-
    member(ToLink-_, EpOrList).
in_ep_or_list(ToLink, ToEpId, EpOrList):-
    ToEpId is -ToLink,
    member(ToEpId-_, EpOrList).

%%----------------------------------------
%% landmark_info(+FromLink, +ToLink, -LandmarkInfo)
%%    returns the landmark information that can be seen in traveling
%%    from FromLink to ToLink.
%%    LandmarkInfo is a list of Landmark, which each Landmark
%%    has 4 fields: visibility, position, landmarktype, landmarkname.
%%    LandmarkInfo is sorted based on visibility.

landmark_info(_, _, []).

%%----------------------------------------
%% street_landmark(+FromTerm, +ToTerm, -StreetLandmark).
%%    FromTerm is Link record for FromLink, ditto for ToTerm.
%%    StreetLandmark will return landmark type of the LINK ToLink
%%    if the there it is different from FromLink street_landmark(FromTerm, ToTerm, []):-    % no landmark changes
    arg(7, FromTerm, Landmark),
    arg(7, ToTerm, Landmark).

street_landmark(_FromTerm, ToTerm, Landmark):- % landmark changes
    arg(7, ToTerm, Landmark).

street_landmark(_, _, []).    % null otherwise

% for now it deals with traffic control devices only

```
% return tcd at FromEpId
traffic_sign(FromEpId, _,
    [SignText1, SignText2, FeetFromCorner, StreetSide]):-
    FromEpId > 0,
    signinfo(FromEpId, _, 'TC', _, SignText1, SignText2, 'T',
        FeetFromCorner, StreetSide).

traffic_sign(FromEpId, _,
    [SignText1, SignText2, FeetFromCorner, StreetSide]):-
    FromEpId < 0,
    FromLink is -FromEpId,
    signinfo(FromLink, _, 'TC', _, SignText1, SignText2, 'F',
        FeetFromCorner, StreetSide).

traffic_sign(_, _, []).

%%------------------------------------------------
%% link_changes_info(+FromTerm, +ToTerm, -LinkChangesInfo)
%%      return interesting changes happened from FromLink to ToLink
%%      FromTerm and ToTerm are link record for FromLink and ToLink
%%      respectively.
%%      LinkChangesInfo will return the most important changes
%%      in this order: street-type-change, name-change,
%%      average speed change, number of lanes change.

link_changes_info(FromTerm, ToTerm, LinkChangesInfo):-
    street_type_changes(FromTerm, ToTerm, LinkChangesInfo).

link_changes_info(FromTerm, ToTerm, LinkChangesInfo):-
    name_changes(FromTerm, ToTerm, LinkChangesInfo).

link_changes_info(FromTerm, ToTerm, LinkChangesInfo):-
    speed_changes(FromTerm, ToTerm, LinkChangesInfo).

link_changes_info(FromTerm, ToTerm, LinkChangesInfo):-
``` num_of_lanes_changes(FromTerm, ToTerm, LinkChangesInfo).

link_changes_info(_, _, []).

%%------------------------------------------------
%% street_type_changes(+FromTerm, +ToTerm, street-type-changes)
%%

% no change in street type
street_type_changes(FromTerm, ToTerm, _):-
    arg(4, FromTerm, StreetType),
    arg(4, ToTerm, StreetType),
    !, fail.

% enter high way
street_type_changes(_, ToTerm, enter_highway):-
%    arg(4, FromTerm, StreetType),
    arg(4, ToTerm, 'EXPY').

street_type_changes(_, ToTerm, enter_highway):-
%    arg(4, FromTerm, StreetType),
    arg(4, ToTerm, 'HWY').

% exit high way
street_type_changes(FromTerm, _, exit_highway):-
    arg(4, FromTerm, 'EXPY').
%    arg(4, ToTerm, StreetType).

street_type_changes(FromTerm, _, exit_highway):-
    arg(4, FromTerm, 'HWY').
%    arg(4, ToTerm, StreetType).

% enter ramp
street_type_changes(_, ToTerm, enter_ramp):-
    arg(4, ToTerm, 'RAMP').

% exit ramp
street_type_changes(FromTerm, _, exit_ramp):-
    arg(4, FromTerm, 'RAMP').

/* street_type_changes(FromTerm, ToTerm, LinkChangesInfo):-
    link_class_changes_for_highway(FromTerm, ToTerm, LinkChangesInfo).

link_class_changes_for_highway(FromTerm, ToTerm, exit_highway):-
    arg(6, FromTerm, '1'),
    arg(6, ToTerm, LinkClass),
    LinkClass \== '1'.

link_class_changes_for_highway(FromTerm, ToTerm, exit_highway):-
    arg(6, FromTerm, '2'),
    arg(6, ToTerm, LinkClass),
    LinkClass \== '2'.

link_class_changes_for_highway(FromTerm, ToTerm, exit_highway):-
    arg(6, FromTerm, '1'),
    arg(6, ToTerm, LinkClass),
    LinkClass \== '1'.

link_class_changes_for_highway(FromTerm, ToTerm, exit_highway):-
    arg(6, FromTerm, '2'),
    arg(6, ToTerm, LinkClass),
    LinkClass \== '2'.
*/
/* enter exit highway from link class? */

%%----------------------------------------
%% name_change(+FromTerm, +ToTerm, -LinkNameChange).
%%   LinkNameChange = namechange(NewBasename), if basename of
%%   both link are not the same, or null otherwise.

% no changes
name_changes(FromTerm, ToTerm, _):-
    arg(3, FromTerm, Basename),
    arg(3, ToTerm, Basename),
    !, fail.

% change in link name
name_changes(_, ToTerm, namechange(Basename)):-
    arg(3, ToTerm, Basename).

%%-------------------------------------------------

%% speed_changes(+FromTerm, +ToTerm, -SpeedChange).
%%     SpeedChange = increase_speed_to(NewSpeed) or
%%                   decrease_speed_to(NewSpeed) if
%%     the average speed of both links is not the same.

% no change
speed_changes(FromTerm, ToTerm, _):-
    arg(8, FromTerm, AvgSpeed),
    arg(8, ToTerm, AvgSpeed),
    !, fail.

% increase average speed
speed_changes(FromTerm, ToTerm, increase_speed_to(AvgSpeed2)):-
    arg(8, FromTerm, AvgSpeed1),
    arg(8, ToTerm, AvgSpeed2),
    AvgSpeed1 < AvgSpeed2.

% decrease average speed
speed_changes(FromTerm, ToTerm, decrease_speed_to(AvgSpeed2)):-
    arg(8, FromTerm, AvgSpeed1),
    arg(8, ToTerm, AvgSpeed2),
    AvgSpeed1 > AvgSpeed2.

%%-------------------------------------------------

```
%% num_of_lanes_changes(+FromTerm, +ToTerm, -NumLanesChange
%%    NumLanesChange = increase_lanes_to(NewNumOfLanes) or
%%                     decrease_lanes_to(NewNumOfLanes)
%% num_of_lanes_changes(FromTerm, ToTerm, _):-
    arg(9, FromTerm, NumOfLanes),
    arg(9, ToTerm, NumOfLanes),
    !, fail.

num_of_lanes_changes(FromTerm, ToTerm, increase_lanes_to(NumOfLanes2)):-
    arg(9, FromTerm, NumOfLanes1),
    arg(9, ToTerm, NumOfLanes2),
    NumOfLanes1 < NumOfLanes2.

num_of_lanes_changes(FromTerm, ToTerm, decrease_lanes_to(NumOfLanes2)):-
    arg(9, FromTerm, NumOfLanes1),
    arg(9, ToTerm, NumOfLanes2),
    NumOfLanes1 > NumOfLanes2.

%%------------------------------------------------
%% link_class_change(+FromTerm, +ToTerm, -LinkClassChange)
%%    LinkClassChange = increase_link_class(NewLinkClass) or
%%                      decrease_link_class(NewLinkClass)

link_class_changes(FromTerm, ToTerm, _):-
    arg(6, FromTerm, LinkClass),
    arg(6, ToTerm, LinkClass),
    !, fail.

link_class_changes(FromTerm, ToTerm, increase_link_class(LinkClass2)):-
    arg(6, FromTerm, LinkClass1),
    arg(6, ToTerm, LinkClass2),
    char_atom( Ord1, LinkClass1 ),
    char_atom( Ord2, LinkClass2 ),
    Ord1 < Ord2.
```

```
link_class_changes(FromTerm, ToTerm, decrease_link_class(LinkClass2)):-
    arg(6, FromTerm, LinkClass1),
    arg(6, ToTerm, LinkClass2),
    char_atom( Ord1, LinkClass1 ),
    char_atom( Ord2, LinkClass2 ),
    Ord1 > Ord2.

intersection_type(FromEpId, ToEpId, NodeInfo, [GeneralProps, Class, NodeInfo])
:-
    arg(5, NodeInfo, NodeType),
    arg(6, NodeInfo, EpOrList),
    general_properties(FromEpId, ToEpId, EpOrList, GeneralProps),
    intersection_class(GeneralProps, NodeType, FromEpId, ToEpId,
            EpOrList, Class).

%%-----------------------------------------
%% general_properties(+FromEp, +ToEp, +EpOrList, -GeneralProp).
%%  return general properties of turn from FromEp to ToEp
%%  with respect to node configuration in EpOrList
general_properties(FromEp, ToEp, EpOrList,
            [Number_of_links_in_node,
            List_of_angle_differences,
                From_to_angle,
                From_to_cardinality,
                Link_labels]):-
    length(EpOrList, Number_of_links_in_node),
    normalize_ep_or_list(FromEp, EpOrList, [],NormEpOrList),
    angle_diff(NormEpOrList, List_of_angle_differences),
    member(FromEp-Or1, NormEpOrList),
    member(ToEp-Or2, NormEpOrList),
    circular_diff(Or1, Or2, From_to_angle),
    cardinality(ToEp, NormEpOrList, 0, From_to_cardinality),
    labeling(List_of_angle_differences, Link_labels).
```

```
%%------------------------------------------
%% normalize_ep_or_list(+FromEp, +RestEpOrList, +ReverseHeadEpOrList,
%%          -NormEpOrList).
%% tail recursive clause for normalizing EpOrList to NormEpOrList
%% (reordering of EpOrList where FromEp is the first element).
normalize_ep_or_list(FromEp, [FromEp-Or|Rest], RevHead, NormEpOrList):-
        reverse(RevHead, Head),
        append([FromEp-Or|Rest], Head, NormEpOrList).

normalize_ep_or_list(FromEp, [Ep-Or|Rest], RevHead, NormEpOrList):-
        normalize_ep_or_list(FromEp, Rest, [Ep-Or|RevHead], NormEpOrList).

%%------------------------------------------
%% angle_diff(+RestEpOrList, +ReverseDiff, -Diff).
%% tail recursive clause for computing angle differences between
%% every pair of link in EpOrList.
angle_diff([_-FirstOr|Rest], Diff):-
        angle_diff_aux([_-FirstOr|Rest], FirstOr, [], Diff).

angle_diff_aux([_-Or], FirstOr, RevDiff, Diff):-
        circular_diff(Or, FirstOr, OrDiff),
        reverse([OrDiff | RevDiff], Diff).

angle_diff_aux([_-Or1, Ep2-Or2 | Rest], FirstOr, RevDiff, Diff):-
    circular_diff(Or1, Or2, OrDiff),
     angle_diff_aux([Ep2-Or2|Rest], FirstOr, [OrDiff|RevDiff], Diff).

circular_diff(Or1, Or2, OrDiff):-
        Or1 > Or2,
        OrDiff is Or2+360-Or1.

circular_diff(Or1, Or2, OrDiff):-
        OrDiff is Or2-Or1.

%%------------------------------------------
```

%% cardinality(+ToEp, +NormEpOrList, +CardinalitySoFar, -Cardinality).
%% tail rec. clause for computing the cardinality of ToEp
%% wrt. Normalize ep or list NormEpOrList
cardinality(ToEp, [ToEp-_|_], Cardinality, Cardinality).
cardinality(ToEp, [_-_|Rest], CardinalitySoFar, Cardinality):-
        Next is CardinalitySoFar+1,
        cardinality(ToEp, Rest, Next, Cardinality).

%%------------------------------------------------
%% labeling(+List_of_angle_differences, -Link_Labels).
%% return labels for each links
labeling(AngleDiffs, Labels):-
        labeling_aux(AngleDiffs, 0, [], Labels).

labeling_aux([], _, RevLabels, Labels):-
        reverse(RevLabels, Labels).
labeling_aux([Diff|Rest], CumAngle, RevLabelsSoFar, Labels):-
        CumAngle2 is CumAngle+Diff,
        label(CumAngle2, Label),
        labeling_aux(Rest, CumAngle2, [Label|RevLabelsSoFar], Labels).

label(X, sharp-left) :- X =< 75.
label(X, left)       :- X =< 105.
label(X, bear-left)  :- X =< 170.
label(X, straight)   :- X =< 190.
label(X, bear-right) :- X =< 255.
label(X, right)      :- X =< 285.
label(_, sharp-right).

%% error_msg(ErrorType, Parameter)
error_msg(notconnected, L):-
        format('ERROR : link ~d and ~d are not connected', L).

intersection_class([2 | _], NodeType,

```
            FromEpId, _, EpOrList, Class):-
     intersection_class2(NodeType, FromEpId, EpOrList, Class).

intersection_class([3 , _, _, Cardinality, _], NodeType,
          FromEpId, ToEpId, EpOrList, Class):-
     intersection_class3(Cardinality, NodeType, FromEpId, ToEpId, EpOrList,
          Class).
intersection_class([4 , _, _, Cardinality, _], NodeType,
          FromEpId, ToEpId, EpOrList, Class):-
     intersection_class4(Cardinality, NodeType, FromEpId, ToEpId, EpOrList,
          Class).
intersection_class(_, _, _, _, _, []).

intersection_class2(two_way_straight, _, _, [two_way_straight, 0, 0]).
intersection_class2(NodeType, FromEpId, [FromEpId-_|_], [NodeType, a, b]).
intersection_class2(NodeType, _, _, [NodeType, b, a]).

intersection_class3(_, t, FromEpId, ToEpId, EpOrList, [t, From, To]):-
     position3(FromEpId, EpOrList, From),
     position3(ToEpId, EpOrList, To).

intersection_class3(_, thin_y, FromEpId, ToEpId, EpOrList,
     [thin_y, From, To]):-
     position3(FromEpId, EpOrList, From),
     position3(ToEpId, EpOrList, To).

intersection_class3(1, wide_y, _, _, _, [wide_y, a, b]).
intersection_class3(2, wide_y, _, _, _, [wide_y, a, c]).

intersection_class3(_, lambda, FromEpId, ToEpId, EpOrList,
     [lambda, From, To]):-
     position3(FromEpId, EpOrList, From),
     position3(ToEpId, EpOrList, To).

intersection_class3(_, inverse_lambda, FromEpId, ToEpId, EpOrList,
```

```
        [inverse_lambda, From, To]):-
    position3(FromEpId, EpOrList, From),
    position3(ToEpId, EpOrList, To).

intersection_class3(_, _, _, _, _, []).

position3(EpId, [EpId-_, _, _], a).
position3(EpId, [_, EpId-_, _], b).
position3(EpId, [_, _, EpId-_], c).

intersection_class4(1, four_way_perpendicular, _, _, _,
        [four_way_perpendicular, a, b]).
intersection_class4(2, four_way_perpendicular, _, _, _,
        [four_way_perpendicular, a, c]).
intersection_class4(3, four_way_perpendicular, _, _, _,
        [four_way_perpendicular, a, d]).

intersection_class4(Cardinality, x, FromEpId, _, EpOrList,
        [x, From, To]):-
    xfrom(FromEpId, EpOrList, From),
    xto(Cardinality, From, To).

intersection_class4(_, k, FromEpId, ToEpId, EpOrList,
        [k, From, To]):-
    position4(FromEpId, EpOrList, From),
    position4(ToEpId, EpOrList, To).
intersection_class4(_, _, _, _, _, []).

xfrom(FromEpId, [FromEpId-_, _, _, _], a).
xfrom(FromEpId, [_, _, FromEpId-_, _], a).
xfrom(_, _, b).
xto(1, a, b).
xto(2, a, c).
xto(3, a, d).
xto(4, a, a).
```

```
xto(N, b, To):-
    N1 is N+1,
    xto(N1, a, To).

position4(Ep, [Ep-_, _, _, _], a).
position4(Ep, [_, Ep-_, _, _], b).
position4(Ep, [_, _, Ep-_, _], c).
position4(Ep, [_, _, _, Ep-_], d).

%%%%%%%%%%%%%%%%%%%%%%%%%%%%%%%%%%
/*        END OF FILE routeinfo.pl        */
%%%%%%%%%%%%%%%%%%%%%%%%%%%%%%%%%%
%-*- Mode:Prolog -*-

%%%%%%%%%%%%%%%%%%%%%%%%%%%%%%%%%%
/* C) Copyright 1991 by Jerry L. Morgan. All Rights reserved. */
%%%%%%%%%%%%%%%%%%%%%%%%%%%%%%%%%%
/* sign.pl

This data base file contains (fictional) sign information, for testing purposes.

Sign information records have the following structure:

signinfo(LinkId,   Link that the sign is associated with
         RecType   '7' for all signs
         SignType  'AD' for advisory or 'TC' for traffic control
         SignValue DT=Detour, ST=Stop, CP=CarPool,
                   BR=Branch, etc.
         SignText1 Main text, or type of tcd
         SignText2 Additional text, or subtype of tcd
         SignDir   N=Northbound, S=Southbound, etc.
             T=visible when traveling to the reference point
             F="...from..."
```

FeetFromCorner 1 - 9999

StreetSide   R, L, or C, for
    "Right", "Left" "Center"

*/ signinfo(13310,'7','AD','B','DUNDEE RD WEST','na','na',0,'na').
signinfo(13318,'7','AD','B','DUNDEE RD EAST','na','na',0,'na').
signinfo(13334,'7','AD','T','NORTHBROOK','na','na',0,'na').
signinfo(13354,'7','AD','T','WHEELING','na','na',0,'na').
signinfo(13374,'7','AD','B','WILLOW RD WEST','na','na',0,'na').

%-*- Mode:Prolog -*-

%%%%%%%%%%%%%%%%%%%%%%%%%%%%%%%%%%%
/* C) Copyright 1991 by Jerry L. Morgan. All Rights reserved. */
%%%%%%%%%%%%%%%%%%%%%%%%%%%%%%%%%%%
/* splan.pl

This file contains procedures for constructing a speech act plan, using a STRIPS-like system with world beliefs, goals, and operators. (See Fikes and Nilsson 1971 for discussion of STRIPS).

I. OVERVIEW. The prolog data base contains a set of structures that can be interpreted as the navigator's beliefs. Among them will be beliefs about what the driver knows already, what actions the driver has already performed, and what the navigator believes the driver needs to do. Having a belief that the driver needs to perform some action causes the navigator to search for a way (a 'plan') to cause the driver to carry out the action the navigator believes the driver needs to carry out.

To construct such a plan, the driver invokes the STRIPS-like mechanism embodied in the s_plan procedure. Given a goal, it searches for an operator that constitutes the final step toward that goal. It then checks to see if the operator's preconditions are already satisfied. If so, then planning is finished, and the plan consists of one operator. But if the preconditions of the operator are not already satisfied, it s_plan invokes itself recursively to construct a plan to bring it about the the preconditions come true. In this way it constructs a plan consisting of a sequence of operators, each embodying one step in a procedure that leads from the current state of the world to the desired goal. This plan (sequence of operators) is then sent to the execution mechanism, which executes the steps in the plan one by one.

```
*/

%%%%%%%%%%%%%%%%%%%%%%%%%%%%%%%%%%
/* s_plan(+Goal,+World,-Plan)
```

This is the main procedure of the speech act planner. It takes as arguments a goal (a prolog clause, roughly interpretable as a proposition) and a representation of the state of the world (a list of prolog clauses, roughly interpretable as a set of propositions). It then finds a plan (list of prolog clauses, roughly interpretable as a sequence of actions to be carried out) whose result will be the achievement of the specified gual.

s_plan calls s_plan1, which does all the work. All s_plan does is reverse the order of actions it gets from s_plan1, which presents them in the order last action first.

```
*/ s_plan(Goal,World,Plan) :-
        s_plan1(Goal,World,Plan1),
        reverse(Plan1,Plan).

%%%%%%%%%%%%%%%%%%%%%%%%%%%%%%%%%%
/*
``` s_plan1(+Goal,+World,-Plan)

This procedure is the real heart of the speech act planner.

*/

/* First case: if there's no goal, nothing needs to be done, so return with an empty plan */ s_plan1([],_,[]).

/* Second case: check if the desired goal is already true. If it is, nothing needs to be done, so return an empty plan */ s_plan1(Goal,World,[]) :-
    unify_member(Goal,World).   %% This compares the goal with the
                                %% 'propositions' in the world set /* Third case if the goal is satisfied in the navigator's world knowledge, again we don't need to do anything. */ s_plan1(Goal,_World,[]) :-
    world_belief(Goal).

/* Fourth case: there is a goal, and it's not satisfied. Check if there's an operator that has the goal as its effect. If there is, take the operator's list of preconditions, and construct a plan to make them all true. Take that plan and add on the action part of the chosen operator. The result is a plan to accomplish the original goal */ s_plan1(Goal,World,[Action|Rest]) :-
    operator(Goal,Preconditions,_,_,Action),   %% look for an operator
    map_s_plan(Preconditions,World,Rest).      %% if found, plan to
                                               %% achieve its preconditions

%%%%%%%%%%%%%%%%%%%%%%%%%%%%%%%%%
/* map_s_plan(+List_of_goals,World,-Plan)

This procedure is like s_plan, except that where s_plan takes a single goal as its argument and tries to construct a plan to achieve it, map_s_plan takes a list of goals, and tries to construct a plan to make them all true.

*/

```
map_s_plan([],_,[]).
map_s_plan([X|Rest],World,Plan) :-
        s_plan1(X,World,PlanX),
        map_s_plan(Rest,World,PlanRest),
        append(PlanX,PlanRest,Plan).
```

%% unify_member takes as arguments a term (T) and a list of terms
%% T. It goes through the list from left to right, attempting to
%% unify T with each term in L until it either succeeds in unifying
%% or runs out of terms in the list.

```
unify_member(_,[]) :- fail,!.
unify_member(Goal,[X|_]) :- term_unify(Goal,X).
unify_member(Goal,[_|Rest]) :- !,unify_member(Goal,Rest).

term_unify(Goal,Target) :- Goal = Target.
```

%%%%%%%%%%%%%%%%%%%%%%%%%%%%%%%%%%%%%
/*

The Navigator's World Beliefs

This section contains a set of prolog clauses that constitutes
the navigator's beliefs about what is maximally helpful in
choosing what to say to the driver. For programming convenience they are done here as
prolog assertions, rather than being put in the set of propositions that constitute the state of the world. The speech act planner uses these as premises in making low-level decisions like selecting referring expressions.

Each clause is described in terms of the beliefs it embodies. The instances of vwrite and vnl in these clauses are there only for debugging purposes.

*/ believe(Believer,Belief) :-
    world_belief(believe(Believer,Belief)).

/*
The navigator believes that the utterance it is giving is maximally helpful iff that utterance has been constructed by selecting all of the relevant information that it believes the driver needs.
*/ world_belief(believe(navigator,
        max_helpful(driver,
            [[Fman,From_Name,To_Name,_From_Type,_To_Type],
             [Gman,Rel_dir,Degree,_Az_out],
             _Fromld,Told,
             Landmarks,_Advisories,TCDs,
             Measures,Subactions],
             [Fman,Gman,Direction,
              Sharpness,From_ref,To_ref,
              SalientLandmarks,RelevantTCDs,Extent,
              [],Sub_content]))) :-
    believe(navigator,can_identify_dir(driver,Rel_dir,Direction)),
    believe(navigator,can_identify_sharp(driver,Degree,Sharpness)),
    believe(navigator,can_identify_from_link(driver,From_Name,From_ref)),
    believe(navigator,can_identify_to_link(driver,Told,To_Name,To_ref)),
    believe(navigator,
        can_identify_landmarks(driver,Landmarks,SalientLandmarks)),
    believe(navigator,can_identify_tcds(driver,Gman,TCDs,RelevantTCDs)), believe(navigator,
    can_identify_extent(driver,Gman,Told,Measures,Extent)),
believe(navigator,
    can_identify_subactions(driver,Subactions,Sub_content)).

/*
The navigator believes that the driver can identify any direction from an utterance that contains the word used to refer to that direction.
*/ world_belief(believe(navigator,
    can_identify_dir(driver,Direction,Direction))) :-
    vnl,vwrite('The navigator believes that the driver can identify'),
    vnl,vwrite('the direction ['),vwrite(Direction),vwrite('] from the word "'),
    vwrite(Direction),vwrite('"'),vnl.

/*
The navigator believes that the driver can identify an angle of a certain number of degrees if the navigator refers to it with a given natural language expression denoting sharpness.
*/ world_belief(believe(navigator,
    can_identify_sharp(driver,Degree,Sharpness))) :-
    get_sharpness(Degree,Sharpness),
    vnl,vwrite('The navigator believes that the driver can identify'),
    vnl,vwrite('a turn whose degree is ['),vwrite(Degree),
    (Sharpness == []
    -> (vwrite('] without an explicit'),vnl,
        vwrite('Natural Language expression denoting it.'),vnl)
    ; (vwrite('] from the Natural Language expression "'),
        vwrite(Sharpness),vwrite('"'),vnl)).

/*

The navigator believes that the driver can identify the link he is currently on from the appropriate referring expn for that link.
*/

```
world_belief(believe(navigator,
                can_identify_from_link(driver,From_name,From_ref))) :-
    get_from_ref(From_name,From_ref),
    vnl,vwrite('The navigator believes that the driver can identify'),
    vnl,vwrite('link ['),vwrite(From_name),
    (From_ref == []
    -> (vwrite('] without an explicit'),vnl,
        vwrite('Natural Language expression denoting it.'))
    ; (vwrite('] from the Natural Language expression "'),
        vwrite(From_ref),vwrite('"'),vnl)).
```

/*
The navigator believes that the driver can identify the link he is traveling to from the appropriate referring expn for that link.
*/

```
world_belief(believe(navigator,
                can_identify_to_link(driver,Told,To_Name,To_ref))) :-
    link_sttype(Told,To_Sttype),
    get_to_ref(To_Sttype,To_Name,To_ref),
    vnl,vwrite('The navigator believes that the driver can identify'),
    vnl,vwrite('the link ['),vwrite(To_Name),
    (To_ref == []
    -> (vwrite('] without an explicit'),vnl,
        vwrite('Natural Language expression denoting it.'),vnl)
    ; (vwrite('] from the Natural Language expression "'),
        vwrite(To_ref),vwrite('"'),vnl)).
```

/*
The navigator believes that the most helpful landmark
information to give to the driver is that which is selected by the get_landmark_ref function.
*/ world_belief(believe(navigator,
    can_identify_landmarks(driver,Landmarks,SalientLandmarks))) :-
        get_landmark_ref(Landmarks,SalientLandmarks).

/*
The navigator believes that the most helpful traffic control
device information to give to the driver is that which is
selected by the get_tcd_ref function.
*/ world_belief(believe(navigator,
    can_identify_tcds(driver,Gman,TCDs,RelevantTCDs))) :-
        get_tcd_ref(Gman,TCDs,RelevantTCDs),
        (RelevantTCDs == []
        -> (vnl,vwrite('There are no traffic control devices at this link,'),
            vnl,vwrite('so no explicit landmark information is available.'),vnl)
        ; (vnl,vwrite('The database contains traffic control information of'),
            vnl,vwrite('the form '),vwrite(TCDs),vwrite(' for this intersection.'),
            vnl,vwrite('The maximally helpful utterance will express this as'),
                vnl,vwrite('"'),vwrite(RelevantTCDs),vwrite('"'),vnl)).

/*
The navigator believes that the driver will be able to identify the extent for which he is to
stay on the current link from the appropriate referring expn for that extent.
*/ world_belief(believe(navigator,
    can_identify_extent(driver,Gman,Told,
        [NumLinks,Length,TransitTime],Extent))) :-
        link_length(Told,To_length),
        express_length(Gman,NumLinks,Length,To_length,TransitTime,Extent),
            vnl,vwrite('The driver is to stay on the current street for '),

```
vwrite(NumLinks),
(NumLinks == 1
-> vwrite(' link, ')
; vwrite(' links, ')),
    vnl,vwrite('with a length of '),
    vwrite(Length).
```

/*
The navigator believes that the driver can identify all of the subactions that make up the given action if maximally helpful semantic info is selected for each of the subactions, and composed into the semantic info for the main action.
*/

```
world_belief(believe(navigator,
            can_identify_subactions(driver,[],[]))).
world_belief(believe(navigator,
            can_identify_subactions(driver,
                    [FirstSubaction|RestSubactions],
                            [FirstSubcontent|RestSubcontent]))) :-
    world_belief(believe(navigator,
        max_helpful(driver,FirstSubaction,FirstSubcontent))),
    world_belief(believe(navigator,
        can_identify_subactions(driver,RestSubactions,RestSubcontent))).
```

%%%%%%%%%%%%%%%%%%%%%%%%%%%%%%%%%
/*

The Information Selector Procedures

Based on the strategies implied in the world_beliefs above, the speech act planner invokes these procedures to select and construct pieces of information that will go into the final sentence output.
*/

/* Select Sharpness: get the sharpness of the turn */

```
get_sharpness(acute,sharp).
get_sharpness(_,[]).
```

/* Select a way of Referring to Streets */

```
get_from_ref('UNNAMED ST',[this,street]).
get_from_ref(From_Name,From_Name).

get_to_ref('RAMP',_To_Name,[the,ramp]).
get_to_ref(_,'UNNAMED ST',[]).
get_to_ref(_,To_Name,To_Name).
```

/* Select Landmarks */

```
get_landmark_ref([_|RestLandmarks],OneLandmark) :-
        reverse(RestLandmarks,LandmarksPassedList),
        extract_lms(LandmarksPassedList,LandmarksPassed),
        get_one_landmark(LandmarksPassed,OneLandmark).

extract_lms([],[]).

extract_lms([[]|RestLinks],LandmarksPassed) :-
        extract_lms(RestLinks,LandmarksPassed).

extract_lms([LMsOnOneLink|RestLinks],LandmarksPassed) :-
        LMsOnOneLink = [[_,FirstLM]|RestLMs],
        extract_lms([RestLMs|RestLinks],RestLMsPassed),
        LandmarksPassed = [FirstLM|RestLMsPassed].

get_one_landmark([],[]).
get_one_landmark([FirstLandmark|_],FirstLandmark).
```

/* Select Traffic control device information */

% For now, if we're going straight, ignore tcd info.

get_tcd_ref(go_straight,_,[]).

% To get an appropriate tcd reference for a turn location:
%     Ignore the first tcd, since that is associated with the end of the link
%        you're turning onto.
%     Reverse the rest of the list, since it was collected with To_link first,
%        From_link at the end.
%     Extract tcds out of their sublists, into one flat list.
%     Get the first tcd from this list.

```
get_tcd_ref(_,[_|RestTCDs],OneTCD) :-
        reverse(RestTCDs,TCDsPassedList),
        extract_tcds(TCDsPassedList,TCDsPassed),
        get_one_tcd(TCDsPassed,OneTCD).

extract_tcds([],[]).

extract_tcds([[]|RestLinks],TCDsPassed) :-
        extract_tcds(RestLinks,TCDsPassed).

extract_tcds([TCDsOnOneLink|RestLinks],TCDsPassed) :-
        TCDsOnOneLink = [[FirstTCD,_]|RestTCDs],
        extract_tcds([RestTCDs|RestLinks],RestTCDsPassed),
        TCDsPassed = [FirstTCD|RestTCDsPassed].

get_one_tcd([],[]).
get_one_tcd([FirstTCD|_],FirstTCD).
```

/* Select appropriate length information */

%%% We give extent in miles if it's half a mile or longer.
%%% In blocks or feet otherwise.

```
express_length(go_straight,NumLinks,From_Length,To_Length,_,Extent) :-
        Length is (From_Length+To_Length),
```

```
        Total_Links is NumLinks+1,
        express_whole_length(Length,Total_Links,Extent).

express_length(_,_,From_Length,_,_,Extent) :-
        From_Length > 0.4,
        length_in_miles(From_Length,Extent).

express_length(_,_,_,_,_,[]).

express_whole_length(Length,NumLinks,Extent) :-
        Length < 0.4
        -> length_in_blocks(NumLinks,Extent)
        ; length_in_miles(Length,Extent).

%% A simple continue is notated as one link, but covers two blocks.

length_in_blocks(1,[two,blocks]).
length_in_blocks(2,[two,blocks]).
length_in_blocks(3,[three,blocks]).
length_in_blocks(4,[four,blocks]).
length_in_blocks(5,[five,blocks]).
length_in_blocks(_,[six,blocks]).

length_in_miles(Length,[onehalf,mile]) :-
        Length < 0.75.
length_in_miles(Length,[one,mile]) :-
        Length < 1.5.
length_in_miles(Length,[two,miles]) :-
        Length < 2.5.
length_in_miles(_,[three,miles]).

%%%%%%%%%%%%%%%%%%%%%%%%%%%%%%%%%%%%%
/*        END OF FILE splan.pl       */
%%%%%%%%%%%%%%%%%%%%%%%%%%%%%%%%%%%%%
```

%-*- Mode:Prolog -*-

%%%%%%%%%%%%%%%%%%%%%%%%%%%%%%%%%%
/* C) Copyright 1991 by Jerry L. Morgan. All Rights reserved. */
%%%%%%%%%%%%%%%%%%%%%%%%%%%%%%%%%%
/* stralias.pl

This data base file contains street aliases for streets with more than one name. Some of the data are fictional, for testing purposes

*/ streetalias(13615,'4',1,na,'IL-62','HWY',na,na,na,na,na,na,na,na,na).
streetalias(13700,'4',1,na,'IL-62','HWY',na,na,na,na,na,na,na,na,na).
streetalias(13720,'4',1,na,'IL-62','HWY',na,na,na,na,na,na,na,na,na).
streetalias(13815,'4',1,na,'IL-62','HWY',na,na,na,na,na,na,na,na,na).

streetalias(13310,'4',1,na,'EXPENSIVE TOLL','HWY',na,na,na,na,na,na,na,na,na).
streetalias(13312,'4',1,na,'EXPENSIVE TOLL','HWY',na,na,na,na,na,na,na,na,na).
streetalias(13314,'4',1,na,'EXPENSIVE %-*- Mode:Prolog -*-

%%%%%%%%%%%%%%%%%%%%%%%%%%%%%%%%%%
/* C) Copyright 1991 by Jerry L. Morgan. All Rights reserved. */
%%%%%%%%%%%%%%%%%%%%%%%%%%%%%%%%%%
/* tree3

This file contains the grammar used by the Unicorn sentence generator to produce English output from the navigation system. For a discussion of how the properties of English are represented in this grammar, see Gerdemann and Hinrichs (1989).

This is a partial list, containing only a few samples.

*/

%% Name of grammar: tree3

%% Last modified: 1-24-91

%% The starting point for this grammar is the grammar called 'vfun',
%% the version last modified 7-25-90. From there, it has been augmented
%% to produce parse trees for the output.

%% We have now gone back to making the vp of the sentence the functor,
%% taking the subject np as its argument.

%% This version of the grammar does not include tree structures,
%% although structure can be inferred from the bracketing in the
%% value of the feature TREE.

%% It does not use X-bar notation. Several earlier version did the
%% work of X-bar syntax by using the notions of COMPS, SPECS, and SUBJS,
%% as in Pollard's paper of Feb 24, 1989. Here, however, we just use
%% COMPS, with a left sister always subcategorizing for its right
%% sister, except in the case of optional verb phrase adverbs.

%% As much as possible, this grammar abstracts away from particular
%% syntactic categories.

%% In this version, optional adverbial modifiers are treated as adjuncts.
%% They subcategorize for their arguments. There are three types of
%% adverbs: those which are obligatory complements of verbs, those
%% that subcategorize for VPs, and those that subcategorize for sentences.

%% This is a minimized version of the grammar, meaning that some feature

%% structures have been simplified for the sake of speed. This should
%% not affect the output. These simplifications will be pointed out
%% in the grammar.

%% Rule for declarative sentences, in X-bar notation written as
%% s -> n2 v2
%% A sentence consists of a noun phrase and a verb phrase s -> v n:
<x0 syn head> = <x1 syn head>
<x0 syn head form> = finite
<x2 syn head case> = nom
<x1 syn head agreement> = <x2 syn head agreement>
<x1 syn comps first> = <x2>
<x1 syn comps rest> = end
<x2 syn comps> = end
<x0 sem trans> = <x1 sem trans>
<x0 sem trans pred> = []
<x1 sem trans> = []
<x0 sem attrib> = <x1 sem attrib>
<x0 tree mother> = s
<x0 tree daughters first> = <x2 tree>
<x0 tree daughters rest first> = <x1 tree>
<x0 tree daughters rest rest> = end.

%% This is the rule for existential 'there'. It introduces there
%% syncategorematically, giving it no semantics. The verb must agree
%% with the post-verbal nominal, so we fail to account for sentences
%% like "There's two roads ahead."

s -> v n:
<x0 syn head> = <x1 syn head>
<x0 syn head form> = finite
<x2 syn head case> = nom
<x1 syn head agreement> = <x2 syn head agreement>

\<x1 syn comps first\> = \<x2\>

\<x1 syn comps rest\> = end

\<x2 syn comps\> = end

\<x0 sem trans\> = \<x1 sem trans\>

\<x0 sem trans\> = []

\<x2 sem trans\> = []

\<x1 sem trans pred\> = exists

\<x0 sem attrib\> = \<x1 sem attrib\>

\<x0 tree mother\> = s

\<x0 tree daughters first\> = \<x1 tree\>

\<x0 tree daughters rest first\> = \<x2 tree\>

\<x0 tree daughters rest rest\> = end.

x0 -> x1 x2:

\<x0 maj\> = {np s}

\<x0 maj\> = \<x1 maj\>

\<x1 maj\> = \<x2 maj\>

\<x0 sem trans pred\> = sequence

\<x0 sem trans arg1\> = \<x1 sem trans\>

\<x0 sem trans arg2\> = \<x2 sem trans\>

\<x0 tree mother\> = s

\<x0 tree daughters first\> = \<x1 tree\>

\<x0 tree daughters rest first maj\> = conj

\<x0 tree daughters rest first phon first\> = and

\<x0 tree daughters rest first phon rest first\> = then

\<x0 tree daughters rest first phon rest rest\> = end

\<x0 tree daughters rest rest first\> = \<x2 tree\>

\<x0 tree daughters rest rest rest\> = end.

x0 -> x1 x2:

\<x0 maj\> = {np s}

\<x0 maj\> = \<x1 maj\>

\<x1 maj\> = \<x2 maj\>

\<x0 sem trans pred\> = simultaneous

\<x0 sem trans arg1\> = \<x1 sem trans\>

<x0 sem trans arg2> = <x2 sem trans>

<x0 tree mother> = s

<x0 tree daughters first> = <x1 tree>

<x0 tree daughters rest first maj> = conj

<x0 tree daughters rest first phon first> = and

<x0 tree daughters rest first phon rest> = end

<x0 tree daughters rest rest first> = <x2 tree>

<x0 tree daughters rest rest rest> = end.

```
%-*- Mode:Prolog -*-

%%%%%%%%%%%%%%%%%%%%%%%%%%%%%%%%%%
/* C) Copyright 1991 by Jerry L. Morgan. All Rights reserved. */
%%%%%%%%%%%%%%%%%%%%%%%%%%%%%%%%%%
/*
``` turn_ops10.pl

This file contains some complex driver action templates, for use by the driver action planner system. The templates and this file can be modified, increased or decreased in number, as the results of experimentation indicate, without changing the architecture of the system.

Driver action representations, both simple and complex, are prolog lists with the following structure:

| ELEMENT | TYPE |
|---|---|
| [ | |
| Functional_description, | List |
| Geometry_description, | List |
| From_link_id, | Integer |
| To_link_id, | Integer |
| Landmarks, | List |
| Advisories | List |
| TCDs | List |

| | |
|---|---|
| Measurements, | List |
| Combinator | See note below |

]

The elements of the list in turn have the following internal structure:

Functional description:

| ELEMENT | TYPE |
|---|---|
| [ | |
| Maneuver, | Atom (Simple: |
| | continue, |
| | change_street |
| | Complex: |
| | continue, |
| | continue_until, |
| | entr_ramp, |
| | quick_link) |
| From_name, | Atom |
| To_name, | Atom |
| From_type, | Integer |
| To_type | Integer |

]

Geometry description:

| ELEMENT | TYPE |
|---|---|
| [ | |
| Maneuver, | Atom (go_straight, turn, bear) |
| Rel_dir, | Atom (straight, left, right) |
| Degree, | Atom (slight, obtuse, acute, recto) |
| Azimuth_out | Integer (0-359) |

]

Landmarks:

A list whose length is the number of links traversed by the action represented. Each element in the list is a list of the landmarks associated with that link.

```
ELEMENT                    TYPE
[
    Landmarks_on_one_link,     List
    Landmarks_on_one_link,     List
    Etc,
]
```

Landmarks_on_one_link:

A list of the landmarks associated with one link. Each landmark is itself represented as a list of two elements, building type and name.

```
ELEMENT                    TYPE
[
    [Building_type1,Name1],    Character (Building type)
    [Building_type2,Name2],    String (Building Name)
    Etc,
]
```

Advisories:

A list whose length is the number of links traversed by the complex action. Each element in the list is a list of the advisory signs associated with that link.

```
ELEMENT                    TYPE
[
    Advisories_on_one_link,    List
    Advisories_on_one_link,    List
    Etc,
]
```

Advisories_on_one_link:

A list of the advisories associated with one link. Each advisory is itself represented as a list of two elements, Text and Sub_text.

| ELEMENT | TYPE |
| --- | --- |
| [ | |
| [Text1,Sub_text1], | list of strings |
| [Text2,Sub_text2], | list of strings |
| Etc, | |
| ] | |

TCDs (traffic control devices):

A list whose length is the number of links traversed by the complex action. Each element in the list is a list of the TCDs associated with that link.

| ELEMENT | TYPE |
| --- | --- |
| [ | |
| TCDs_on_one_link, | List |
| TCDs_on_one_link, | List |
| Etc, | |
| ] | |

TCDs_on_one_link:

A list of the TCDs associated with one link. Each TCD is itself represented as a list of two elements, TCD_type and TCD_subtype.

| ELEMENT | TYPE |
| --- | --- |
| [ | |
| [TCD_type1,TCD_subtype1], | TCD_type and _subtype: |
| [TCD_type2,TCD_subtype2], | traffic light |
| Etc, | standard |
| ] | blinking red |

```
            blinking yellow
            stop sign
            all way
            this street
            cross street
            yield sign
            this street
            cross street
            railway crossing
```

Measurements:

A list of relevant measurements of the sub-route covered by the simple or complex action.

```
    ELEMENT              TYPE
[
    Nr_of_links,         number
    Length,              number (miles)
    Transit_time         number (seconds)
]
```

Combinator:

For simple turns, this is []. For complex turns, it is an instruction used by the planner to build a CDAR from the constituent actions. In turn operators, this is an atom specifying how to combine the constituent turns.

```
    ELEMENT              TYPE
[
    Combinator           atom
]
*/
%%%%%%%%%%%%%%%%%%%%%%%%%%%%%%%%%%%%%
```

Finally, here are some example operators that have actually been used by the system.

*/

%%%%%%%%%%%%%%%%%%%%%%%%%%%%%%%%%
/*

Entrance ramp to highway

If the first action is from a street to a ramp, and the second is from a ramp to a highway, then we have an action of entering a highway via a ramp

*/ complex_turn_op([

[_Fman1,From_name1,_,From_type1,To_type1],

Gdescription1,

From_link1,

To_link1,

PreviousLandmarks,

PreviousAdvisories,

PreviousTCDs,

[Nr_links1,Length1,Time1],

_],

[

[_Fman2,_,To_name2,_,To_type2],

_,

_,

To_link2,

[NewToLandmarks,_],

[NewToAdvisories,_],

[NewToTCDs,_],

[Nr_links2,Length2,Time2],

```
        _],
        [
            [entr_ramp,From_name1,To_name2,From_type1,To_type2],
            Gdescription1,
            From_link1,
            To_link2,
            [NewToLandmarks|PreviousLandmarks],
            [NewToAdvisories|PreviousAdvisories],
            [NewToTCDs|PreviousTCDs],
            [Nr_links_sum,Length_sum,Time_sum],
            right_list]) :-
link_sttype(To_link1,To_sttype1),
To_sttype1 = 'RAMP',
member(To_type1,['6','7']), % Confirm this is a ramp
member(To_type2,['1','2']), % Going to a highway
Nr_links_sum is (Nr_links1+Nr_links2),
Length_sum is (Length1+Length2),
Time_sum is (Time1+Time2).

%%%%%%%%%%%%%%%%%%%%%%%%%%%%%%%%%%%%%
/*

Exit ramp from highway

*/ complex_turn_op([
            [_Fman1,From_name1,_,From_type1,To_type1],
            Gdescription1,
            From_link1,
            To_link1,
            PreviousLandmarks,
            PreviousAdvisories,
            PreviousTCDs,
            [Nr_links1,Length1,Time1],
```

```
        _],
        [
          [_Fman2,_,To_name2,_,To_type2],
          _
          _
          To_link2,
          [NewToLandmarks,_],
          [NewToAdvisories,_],
          [NewToTCDs,_],
          [Nr_links2,Length2,Time2],
          _],
        [
          [exit_ramp,From_name1,To_name2,From_type1,To_type2],
          Gdescription1,
          From_link1,
          To_link2,
          [NewToLandmarks|PreviousLandmarks],
          [NewToAdvisories|PreviousAdvisories],
          [NewToTCDs|PreviousTCDs],
          [Nr_links_sum,Length_sum,Time_sum],
          right_list]) :-
    member(To_type1,['6','7']),          % Confirm this is a ramp
    member(From_type1,['1','2','3','4','6']),  % Leaving a highway
    link_sttype(To_link1,To_sttype1),
    To_sttype1 = 'RAMP',
    Nr_links_sum is (Nr_links1+Nr_links2),
    Length_sum is (Length1+Length2),
    Time_sum is (Time1+Time2).

%%%%%%%%%%%%%%%%%%%%%%%%%%%%%%%%%%%%%%
/* quick link
```

This operator is intended to catch sequences of turns that come so quickly that there's not time between turns to issue driving instructions. So we lump them together as one complex action and give instructions for the whole sequence before it begins.

*/ complex_turn_op([
    [_Man1,From_name1,_,From_type1,_],
    [Gman1,_,_,_],
    From_link1,
    _,
    PreviousLandmarks,
    PreviousAdvisories,
    PreviousTCDs,
    [Nr_links1,Length1,Time1],
    _],
    [
    [_Man2,_,To_name2,_,To_type2],
    [Gman2,Rel2,Degree2,Az2],
    _,
    To_link2,
    [NewToLandmarks,_],
    [NewToAdvisories,_],
    [NewToTCDs,_],
    [Nr_links2,Length2,Time2],
    _],
    [
    [quick_link,From_name1,To_name2,From_type1,To_type2],
    [Gman2,Rel2,Degree2,Az2],
    From_link1,
    To_link2,
    [NewToLandmarks|PreviousLandmarks],
    [NewToAdvisories|PreviousAdvisories],
    [NewToTCDs|PreviousTCDs],
    [Nr_links_sum,Length_sum,Time_sum],

```
          right_list]) :-
    Gman1 \== go_straight,
    Gman2 \== go_straight,
    link_sttype(To_link2,To_sttype2),
    To_sttype2 \== 'RAMP',
    Time2 < 7.0,      %% crucial check for time
    Length_sum is (Length1+Length2),
    Time_sum is (Time1+Time2).

%%%%%%%%%%%%%%%%%%%%%%%%%%%%%%%%%%%%
/* continue

This operator is intended to group together a sequence of
follow-this-street action into one long
follow-this-street-for-n-miles/blocks/... action, combining them
two at a time.

Both subactions must be either go_straights or bears. If either
is a bear, then the street can't be unnamed. This allows us to
count a bear as a continue in the general case, but prevents it
in the case of a fork, where both of the choices are unnamed.
But the cost is that we also prevent counting a bear as a
continue on an unnamed road WITHOUT a fork, i.e. where the road
just angles off a bit.

*/ complex_turn_op([
         [continue,From_name1,_,From_type1,_],    %% F description
                [Gman1,_,_,_],                    %% G description
                From_link1,
                _,                                %% To_link
           PreviousLandmarks,
```

```
        PreviousAdvisories,
        PreviousTCDs,
        [Nr_links1,Length1,Time1],   %% Measurements
        _],                           %% Sub-descriptions
    [
        [continue,_,To_name1,_,_],
        Gdescription2,
        _,
        To_link2,
        [NewToLandmarks,_],
        [NewToAdvisories,_],
        [NewToTCDs,_],
        [Nr_links2,Length2,Time2],
        _],
    [
        [continue,From_name1,To_name1,From_type1,From_type1],
        Gdescription2,
        From_link1,
        To_link2,
        [NewToLandmarks|PreviousLandmarks],
        [NewToAdvisories|PreviousAdvisories],
        [NewToTCDs|PreviousTCDs],
        [Nr_links_sum,Length_sum,Time_sum],
        right_append]) :-
    Gdescription2 = [Gman2,_,_,_],
    member(Gman1,[go_straight]),
    member(Gman2,[go_straight]),
    Nr_links_sum is (Nr_links1+Nr_links2),
    Length_sum is (Length1+Length2),
    Time_sum is (Time1+Time2).

%%%%%%%%%%%%%%%%%%%%%%%%%%%%%%'
/*
``` continue until:

This template looks for a long continue, followed by a turn, and combines them into a large continue-on-this-street-until action.

*/ complex_turn_op([
    [continue,From_name1,_,From_type1,_], %% F description
    [go_straight,_,_,_], %% G description
    From_link1,
    _, %% To_link
    PreviousLandmarks,
    PreviousAdvisories,
    PreviousTCDs,
    [Nr_links1,Length1,Time1], %% Measurements
    _], %% Sub-descriptions
[
    [_Maneuver2,_,To_name2,_,To_type2],
    [Gman2,Rel2,Degree2,Az2],
    _,
    To_link2,
    [NewToLandmarks,_],
    [NewToAdvisories,_],
    [NewToTCDs,_],
    [Nr_links2,Length2,Time2],
    _],
[
    [continue_until,From_name1,To_name2,From_type1,To_type2],
    [Gman2,Rel2,Degree2,Az2],
    From_link1,
    To_link2,
    [NewToLandmarks|PreviousLandmarks],
    [NewToAdvisories|PreviousAdvisories],
    [NewToTCDs|PreviousTCDs],

```
        [Nr_links_sum,Length_sum,Time_sum],
     right_list]) :-
link_sttype(To_link2,To_sttype2),
To_sttype2 \== 'RAMP',
Gman2 \== go_straight,
Nr_links_sum is (Nr_links1+Nr_links2),
Length_sum is (Length1+Length2),
Time_sum is (Time1+Time2).

%%%%%%%%%%%%%%%%%%%%%%%%%%%%%%
/*      END OF FILE turn_ops10.pl       */
%%%%%%%%%%%%%%%%%%%%%%%%%%%%%%
```

What is claimed is:

1. A method of generating instructions to navigate along a route between a starting location and a desired destination location, said route being comprised of at least one road segment, a plurality of the characteristics of a plurality of road segments being known and defined in a series of data records, said method comprised of the steps of:
   a) planning a speech action for a user, that describes at least one operation to be performed by the user, to traverse at least one segment between the starting location and the destination location;
   b) determining which speech act, from a predetermined set of possible speech acts, is required to convey an instruction to the user to perform said at least one operation;
   c) for the speech act of step b:
      forming a subset of speech clauses from a set of possible speech clauses to convey said instruction;
      clausifying said subset of speech clauses prior to generating an audible speech clauses:
      generating an audible speech clause from said subset of speech clauses.

2. The method of claim 1 where the step of planning a speech action for a user further includes recusively calling simple turn loops to form a complex turn loop.

3. The method of claim 1 where the step of planning a speech action includes parsing sequences of simple action representations for single intersections.

4. The method of claim 1 including the step of providing a preroute summary to the user.

5. An apparatus for generating instructions to navigate along a route between a starting location and a desired destination location, said route being comprised of at least one road segment, a plurality of the characteristics of a plurality of road segments being known and defined in a series of data records, said apparatus comprised of:
   means for planning a speech action for a user, that describes at least one operation to be performed by the user, to traverse at least one segment between the starting location and the destination location;
   means for determining which speech act, from a predetermined set of possible speech acts, is required to convey an instruction to the user to perform said at least one operation;
   means for forming a subset of speech clauses from a set of possible speech clauses to convey said instruction;
   means for clausifying said subset of speech clauses prior to generating an audible speech cluases:
   means for generating an audible speech clause from said subset of speech clauses.

6. The apparatus of claim 5 including means for planning a speech action for a user that further includes means for recusively calling simple turn loops to form a complex turn loop.

7. The method of claim 5 where the means for planning a speech action includes a means for parsing sequences of simple action representations for single intersections.

8. The apparatus of claim 5 including a means for providing a pre-route summary to the user.

* * * * *